(12) United States Patent
Usami

(10) Patent No.: US 6,377,366 B1
(45) Date of Patent: Apr. 23, 2002

(54) COLOR REPRODUCTION DATA CONVERTING METHOD

(75) Inventor: Yoshinori Usami, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/765,370

(22) Filed: Jan. 22, 2001

Related U.S. Application Data

(63) Continuation of application No. 08/971,335, filed on Nov. 17, 1997.

(30) Foreign Application Priority Data

Nov. 15, 1996 (JP) ................................. 8-304883
Dec. 16, 1996 (JP) ................................. 8-335938

(51) Int. Cl.$^7$ ................................. G03F 3/08
(52) U.S. Cl. ................................. 358/520; 382/162
(58) Field of Search ................................. 382/162, 167; 358/79, 518, 520

(56) References Cited

U.S. PATENT DOCUMENTS

| | | | | |
|---|---|---|---|---|
| 5,084,762 A | * | 1/1992 | Miyakawa | 358/79 |
| 5,398,121 A | | 3/1995 | Kowalewski et al. | 358/504 |
| 5,425,134 A | | 6/1995 | Ishida | 395/109 |
| 5,502,580 A | * | 3/1996 | Yoda et al. | 358/518 |
| 5,774,238 A | | 6/1998 | Tsukada | 358/529 |

FOREIGN PATENT DOCUMENTS

| | | | |
|---|---|---|---|
| JP | 3-158071 | 7/1991 | H04N/1/46 |
| JP | 3-175452 | 7/1991 | G03F/5/00 |
| JP | 9-9086 | 1/1997 | H04N/1/60 |

* cited by examiner

Primary Examiner—Von J. Couso
(74) Attorney, Agent, or Firm—Sughrue Mion, PLLC

(57) ABSTRACT

The improved color reproduction data conversion method of the present invention comprises the steps of obtaining the color matching ink amounts of CMY colors being metamer with the calorimetric data as to a plurality of different amounts of K-plate; obtaining an achromatic amount from a total ink amount of CMYK for each amount of the K plate; obtaining an achromatic amount function for the amount of the K plate in the linear portion; generating a mapping function from the calorimetric data and the achromatic amount to the ink amounts of CMYK in the linear portion and obtaining a weighting coefficient for reflecting to the achromatic amount with the K plate control condition previously selected; determining the achromatic amount from the colorimetric data; and calculating ink amounts of CMYK from the achromatic amount and the calorimetric data with the use of the mapping function of the CMYK ink amount. As a result, the invention method can obtain reproducible four-dimensional color reproduction data for actual printing from the three-dimensional colorimetric data while maintaining metamerism under a K plate generating condition set up arbitrarily by the user.

22 Claims, 9 Drawing Sheets

L*  Dotted line: with K plate
    Solid line: without K plate

COLOR REPRODUCTION DATA CONVERTING METHOD

This is a continuation of application Ser. No. 08/971,335 filed Nov. 17, 1997.

BACKGROUND OF THE INVENTION

The present invention relates generally to a method of converting color reproduction data, and particularly to a method of automatically converting three-dimensional data representing calorimetric appearance into four-dimensional CMYK (or cyan (C), magenta (M), yellow (Y), and black (K)) color reproduction data used in printing or by a color printer. This method involves maintaining color matching conditions under arbitrary K plate conditions, and in this case, involves a method of determining the arbitrary amount of the K plate formation condition automatically.

In the field of printing, a printed area is usually represented by an area modulation of a halftone percentage of CMYK. When converting arbitrary color reproduction data, such as RGB (or red (R), green (G), blue (B)), into the color reproduction data of four colors or more, including the K plate, conversion conditions, using techniques such as the separation curve or the look-up table (LUT) are determined by the user based on the purpose of the print and empirical knowledge. In this respect, determining an arbitrary K plate formation condition before color conversion, while maintaining colorimetric color reproduction data, becomes quite difficult. Generally, the mapping relationship from CMYK to three-dimensional colorimetric space, such as RGB or L*a*b and XYZ, is not one-to-one; therefore, the inverse mapping from three-dimensional space into four-dimensional CMYK is not simple, nor is the answer unique.

This method proposes a solution of treating the mapping instead as a 3-to-3 mapping of CMY to calorimetric data after restricting the K plate to a certain condition. The K plate refers to an axis in the ink color space which further includes the C,M, and Y axes. Previous techniques for color adjustment include the method of solving Neugebauer equations by successive approximation with partial differentiation in 3-to-4 conversion while holding the K plate constant, as shown in the Japanese Patent Application Opened No. 175,452/91, and the method of achieving 3-to-3 conversion with a specified K plate condition, where the K plate has been previously determined and the printed matter is subject to colorimetry (a chart), as shown in Japanese Patent Application Opened No. 158,071/91.

In the first of these conventional methods, CMYK generation (3-to-4 conversion) can only be performed where the K plate condition is specified leaving little flexibility in the printing. The second method can conceivably calculate 3-to-4 conversion as a limited solution with a previously limited K plate condition (substituted and added amounts by K plate), but the 3-to-4 conversion must be completely repeated whenever the K plate conditions are changed, thus producing processing delays for variations in the K parameter. Because the output and measurement of a similar chart are necessary, the user has a lesser degree of freedom for deciding the arbitrary K plate condition and achieving 3-to-4 conversion on that condition. In selecting the K plate amount, it is difficult to set this condition while being conscious of practical print restrictions, such as maximum ink amount.

In the printing field, a user demands arbitrary CMYK generation for every image for at least the following purposes. It is better, in printing, to reflect the general print purposes of the following typical K plate generation as a condition when deciding the K plate amount where the K plate amount refers to an ink amount corresponding to the halftone dot % of the K plate.:

1) The portion that CMY inks are printed with the fixed and equal amount is considered as gray; this portion is then substituted for the K plate as a colorimetric reproducible equivalent, securing stability and precision of color reproduction mainly of gray (and so-called achromatic plate-making is realized).
2) The total amount of ink is reduced, the balance distribution is considered, and thus, stabilization of printing is possible.
3) The maximum density realized by the three colors of CMY is increased and the range of maximum density is defined.

However, the preparation of every picture with the K plate condition that satisfies the above ideal conditions requires significant experience and skill. Setting up the K plate condition with greater flexibility, including greater degrees of freedom, and still achieving accurate conversion is even more difficult when considering both colorimetric reproduction and actual print restrictions.

Moreover, the quantitative methods involved with setting the K plate condition considering the above limitations are not well established, so this presents a difficult problem.

SUMMARY OF THE INVENTION

It is an object of the present invention to eliminate the above technical problems with the conventional methods, and to provide a color reproduction data conversion method capable of permitting the user to set the K plate condition with a higher degree of freedom (such as with respect to chroma weight, brightness weight or K plate values); to convert three-dimensional colorimetric data into four color separation data (CMYK), while maintaining the colorimetric reproduction condition of the original three-dimensional calorimetric data; to obtain reproducible four-dimensional color reproduction data suitable for printing; and to separate the data into four colors, taking into consideration any non-linearities in the conversion process.

Another object of the present invention is to provide a color reproduction data conversion method that is capable of allowing the user to optionally establish the K plate condition while maintaining the colorimetric reproduction condition; to select a parameter most suitable for every image in order to determine the K plate condition; and particularly, to automatically set up the K plate generating condition without requiring the user to have empirical knowledge about print fitness and stability, when converting three-dimensional colorimetric data, into four color separation data (CMYK), while maintaining colorimetric color matching under the arbitrary selected K plate generating condition; and to obtain the most suitable four-dimensional color reproduction data separated from four colors.

In order to achieve these objectives, the first embodiment of the invention provides for a color reproduction data conversion method for converting three-dimensional calorimetric data into four-dimensional color reproduction data containing color components of cyan (C), magenta (M), yellow (Y), and black (K) while keeping a degree of metamerism comprising the steps of:

performing an inverse conversion from three-dimensional calorimetric space to three-dimensional CMY color space as to a plurality of different K plate amounts to obtain color matching ink amounts of CMY colors being metamer with the three-dimensional colorimetric data;

obtaining an achromatic amount comprising a ratio of total ink amount of CMYK for each of the plurality of different K plate amounts to a total ink amount of CMYK in the case where the K plate amount is set to a reference amount;

obtaining an achromatic amount function for said plurality of K plate amounts in a linear portion by examining and eliminating a non-linear portion in which said achromatic amount becomes non-linear for the plurality of K plate amounts;

generating a mapping function from the three-dimensional colorimetric data and the achromatic amount to the ink amounts of CMYK in the linear portion; and obtaining a K plate control condition as a weighting coefficient which reflects a K plate control condition for the achromatic amount successively, to perform a weighting of the achromatic amount with said K plate control condition previously selected;

determining the achromatic amount from the achromatic amount function and using the selected K plate control condition as a restraint condition for the inverse conversion from the three-dimensional colorimetric data to the four-dimensional color reproduction data; and calculating the ink amounts of CMYK from the thus determined achromatic amount and the three-dimensional colorimetric data with the use of said mapping function of the CMYK ink amount; and printing an image based on the calculated ink amount.

Preferably, the K plate control condition would include at least a K plate substitution amount, a maximum K plate limit, a chroma weight, and a brightness weight. The K plate substitution amount refers to the sum of ink amounts substituted by the K plate in CMY ink amounts. The K plate substitution amount is usually represented as a halftone dot %.

Preferably, said inverse conversion from the three-dimensional colorimetric space to the three-dimensional CMY color space as to the plurality of the different K plate amounts is performed based on a forward conversion from a four-dimensional CMYK color space to the three-dimensional colorimetric space obtained via interpolation, calculated by making colorimetry measurements with specified color patches.

Preferably, at least one of either the CMYK ink amount mapping function or the achromatic amount function performs a K plate generation by storing as a profile of K plate generation of a previous amount, and by making successive callings.

Preferably, when a point of the color gamut outside of the print range is required for the calculation of the ink amount of CMYK, the K plate outside the color gamut is estimated as a maximum likelihood by using a parameter of the same dimension as the restraint condition used in calculating said achromatic amount function, in such a way that the K plate outside the color gamut is continued from the K plate inside the color gamut. If the thus assumed K plate is not less than 0% and not more than 100%, CMY ink amounts outside the color gamut are obtained by determining the color matching ink amounts in the assumed K plate, and if the assumed K plate is less than 0% or more than 100%, imaginary CMY ink amounts outside the gamut are estimated from a recurrence formula in a specified division space.

In a second embodiment of the invention, there is provided a color reproduction data conversion method for converting three-dimensional colorimetric data into four-dimensional color reproduction data containing color components of CMYK while keeping a degree of metamerism, comprising steps of:

setting up a restraint condition to a K plate; and obtaining mapping of three-dimensional CMY reproduction data from the three-dimensional calorimetric data by using a forward normal lattice mapping function of three-dimensional colorimetric data from the four-dimensional color reproduction data of CMYK using successive approximation or error minimization methods;

wherein a K plate control amount is included as a parameter reflecting said restraint condition of the K plate, and said K plate control amount is established by the most suitable value demanded by previous experiment for print stability of image analytical data; and wherein said K plate control amount comprises at least one of a K plate substitution amount and a maximum limit on K plate amount, and the analytical image data contains at least a gray histogram.

Preferably, said K plate control amount also includes at least one of either chroma weight or brightness weight.

Preferably, said image analytical data includes a basic ink gross amount of CMY, a maximum brightness, and a minimum brightness. The basic ink gross amount corresponds to a CMY ink gross amount when K=0.

Preferably, said forward normal lattice mapping function is obtained by subjecting specified color patches to colorimetry and by making the forward conversion obtained by interpolation from four-dimensional CMYK color space to three-dimensional colorimetric space.

Preferably, said K plate restraint condition is a K plate substitution ratio at each amount of the K plate. The K plate substitution ratio is a ratio of the total amount of CMYK in each amount of the K plate to the total amount of CMYK when the amount of the K plate is a reference amount. This characteristic may also be referred to as an "achromatic amount" The K plate substitution ratio at each amount of the K plate is obtained by making an inverse conversion from a three-dimensional colorimetric space to a three-dimensional CMY color space as to a plurality of different amounts of the K plate including the reference amount with the use of the forward normal lattice mapping function to obtain CMY ink amounts being metamer with the three-dimensional calorimetric data.

Preferably, said K plate substitution ratio is defined as the K plate substitution ratio function being a variable of the amount of the K plate in an effective reproduction area, and said K plate control amount is obtained as a weighting coefficient reflected by successive K plate substitution ratios to perform a weighting to the K plate substitution ratio.

Setting of the K plate restraint condition is performed in such a way that the most suitable K plate control amount is obtained as a parameter reflected on the K plate restraint condition for the image analytical data obtained from the three-dimensional colorimetric data, the K plate substitution ratio is weighted as the weighting coefficient with the most suitable K plate control amount thus obtained, and the K plate substitution ratio is decided from the thus set K plate control amount and the K plate substitution ratio function, and finally, the ink amounts of CMYK are calculated as four-dimensional color reproduction data.

BRIEF DESCRIPTION OF THE DRAWINGS

FIGS. 5A through 5D show the K plate control conditions for the color reproduction data conversion method of the present invention, wherein FIG. 5A shows an example of K plate substitution strength, FIG. 5B shows an example of chroma weight, FIG. 5C shows one example of a maximum limit on the K plate amount, and FIG. 5D shows one example of brightness weight;

DETAILED DESCRIPTION OF THE INVENTION

A color reproduction data conversion method according to the present invention is further described in detail with reference to the accompanying drawings.

First, one embodiment of a color reproduction data conversion method according to the present invention is further described in detail with reference to FIGS. 1 to 8.

The present invention uses the achromatic amount based on an ink amount of the print color space as a constraint condition for performing reverse conversion from three-dimensional data to four-dimensional data with the color matching condition, and reflects the K plate condition chosen arbitrarily by the user, to the chromatic amount to generate a K plate. Converting the three-dimensional calorimetric data into four-dimensional color reproduction data of CMYK, inherent to print, enables the selection of the K plate amount flexibly to generate colorimetric color matching CMYK color reproduction data, as is essential to achieve the above mentioned print purposes. In particular, a K plate substitution amount can be adjusted in CMY inks, the total amount of ink can be reduced and a maximum density realized by CMY can be increased.

Generally, printing is done in four colors (CMYK), so it is not a mapping relationship of 1-1 from the three-dimensional calorimetric space data, such as CIEXYZ or L*a*b*. For example, most mappings of several CMYK values show the same colorimetric values and are not orthogonalized. In this respect, it is not easy to obtain a closed solution by mapping data in arbitrary three-dimensional space to four-dimensional space, and some restraint condition is necessary in order to obtain the mapping.

According to the present invention, a user selects the K plate condition as an arbitrary restraint condition under a physical limit, such as ink amount in real print color space. The mapping from three-dimensional color space to four-dimensional color space is performed under this restraint condition.

Figure 1:
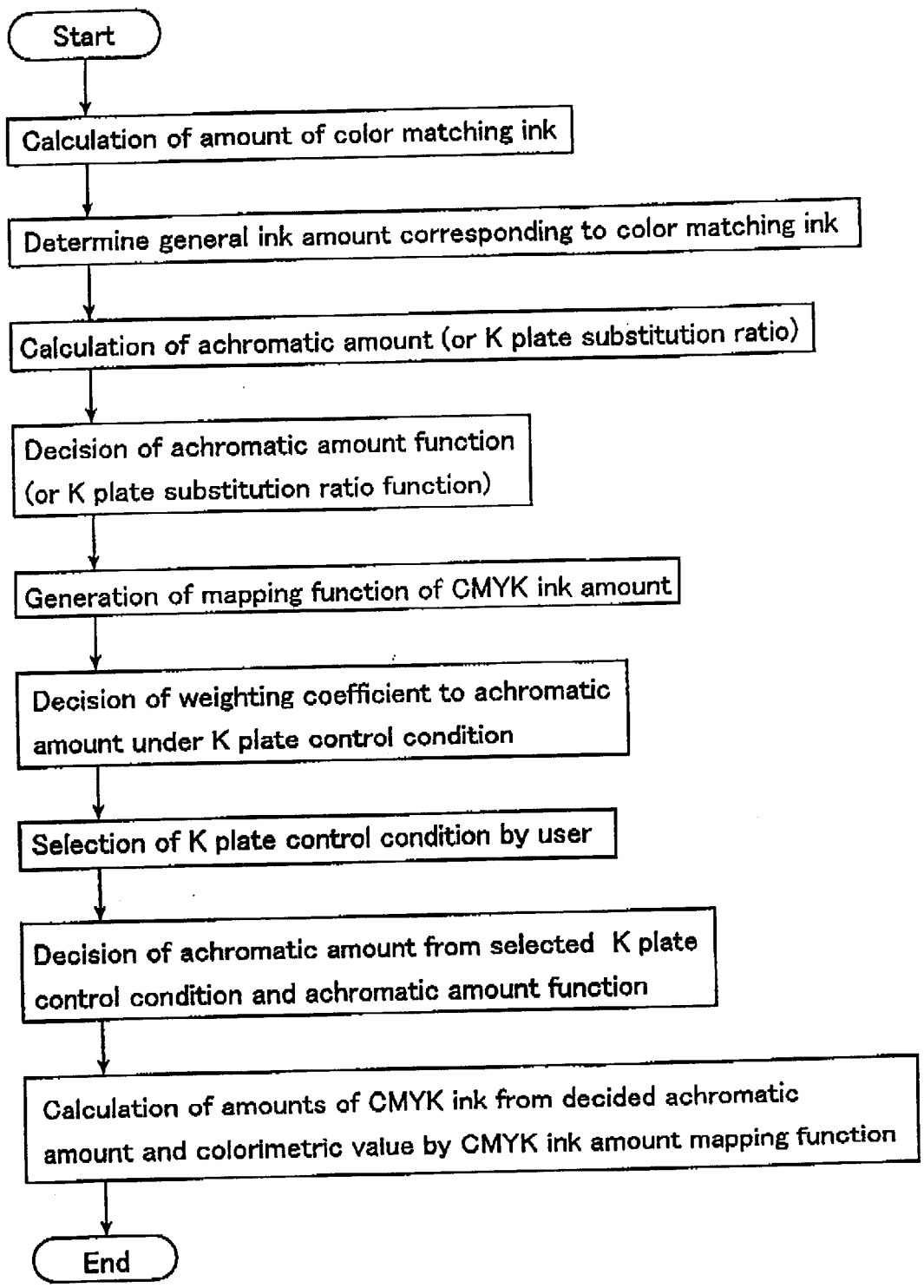
FIG. 1 is a flow chart showing one embodiment of the color reproduction data conversion method according to the present invention.

As shown in FIG. 1, the calculation of an amount of color matching ink is the first step of the present invention. Color matching ink amounts correspond to ink amounts of respective CMY colors that are metamer with a color represented as calorimetric values, such as XYZ. In this first step, the color matching ink amount for varying K plate amounts in ink amount space is calculated. Even with the addition of the K ink, a metamer condition is maintained in the CMYK space and the XYZ space. In the second step, the general ink amount is obtained for each K plate amount. The general ink amount can be represented by the sum of the color matching ink amounts, namely the halftone dot % of C, M, Y and replaced by the total ink amount. In the third step, the K plate substitution ratio (or achromatic amount) is obtained from the general ink amount ratio to be differed by the K plate amount in color matching.

Hereinafter, the process characterized by the first embodiment of the present invention is described in detail based on the flow-chart of the method according to the present invention shown in FIG. 1.

The characteristic portion of the present invention is the utilization of the achromatic amount as a restraint condition to realize the inverse mapping from three-dimensional calorimetric space to four-dimensional device space of CMYK.

Herein, the color matching ink amount corresponds to an ink amount of CMY that is color matched with three-dimensional colorimetric data (for example, XYZ value) when the K plate amount is a reference amount, such as 0%.

This color matching ink amount can be obtained by performing a 3-to-3 reverse conversion from three-dimensional colorimetric space to the three-dimensional color reproduction system of CMY for the discrete K plate amount by using the forward directional conversion data from the color reproduction system of 4-color CMYK (four-dimensional device space) to the three-dimensional colorimetric space (for example, XYZ). The 3-to-3 reverse conversion method necessary to obtain this color matching ink amount is not particularly limited, if the inverse conversion from three-dimensional calorimetric space to three-dimensional color reproduction space is possible, but it can be done using a well-known 3-to-3 inverse conversion method. One preferred method is the color conversion method described in Japanese Patent Application Opened No. 156555/95 belonging to the Assignee of the present application.

The method of obtaining forward direction conversion data from systems for changing four color CMYK, such as printing, to calorimetric space, thus forming the basis of 3-to-3 inverse conversion, and forward direction normal lattice mapping functions (such as LUT) for performing the forward direction conversion are not particularly limited, so any well-known method for performing forward direction conversion can be used. In other words, the forward direction conversion data and forward direction normal lattice mapping function may be obtained by well-known methods, for example, the method in which a color patch or the like, printed with the specified halftone dot percentage is subjected to colorimetry, interpolated, and calculated.

The three-dimensional colorimetric data according to the present invention is not limited; that is, any three-dimensional color space data can be used if it is capable of being converted into three-dimensional colorimetric data. For example, Luv, YIQ, YCC, HIS, and RGB may be used. Also, four-dimensional color reproduction data in the present invention may preferably be data of the four-colored ink amount of CMYK containing a black (K) plate.

Next, as shown in FIG. 1, the fourth step of the present invention, the portion that is nonlinear and problematic in print reproduction is examined with respect to the achromatic amount obtained in the third step, and a relationship between the K plate amount and the linear portion of the achromatic amount is found, this relationship being the achromatic amount function.

Further, as shown in FIG. 1, the fifth step of the present invention involves the generation of mapping functions from the calorimetric data and achromatic amount to the CMYK ink amount, only for the linear portion of the achromatic amount function.

In the sixth step of the present invention, as shown in FIG. 1, a weight coefficient, to allow free selection of the K plate amount, is obtained by reflecting the K plate selecting condition on the achromatic amount. In this respect, the selection condition for the K plate control indicated by the user may preferably be at least K plate substitution amount, K plate maximum limit, chroma weight, and brightness weight.

In the present invention, the above-mentioned steps are performed prior to a printing function; the achromatic amount function, weight coefficient, and the CMYK ink amount mapping function are obtained previously. In the seventh step of the present invention, as shown in FIG. 1, the final achromatic amount is determined from the linear portion of the K plate substitution ratio function and the weight coefficient due to the K plate control condition selected arbitrarily by the user, and is used as a restraint condition for 3-to-4 inverse conversion from three-dimensional color space (colorimetry data) to four-dimensional color space (CMYK color reproduction data).

As shown in FIG. 1, in the eighth step of the present invention, the ink amount of CMYK is finally obtained using the mapping function from three-dimensional colorimetric data and the latest achromatic amount thus decided to CMYK ink amount.

The important matter is that the ink amount of CMYK to be obtained is in the color reproduction gamut of print. That is, the process of this step is handled completely in the gamut.

In this respect, the achromatic amount function (achromatic amount limit) and the mapping functions from the achromatic amount to CMYK ink amount are stored as a profile, and called serially, thereby making rapid K plate generation possible.

In this way, in the gamut, CMYK ink amount (four-dimensional color reproduction data) can be obtained from arbitrary three-dimensional calorimetric data with the printable K plate condition selected voluntarily by the user.

In the case of obtaining the mapping from arbitrary colorimetric value (three-dimensional calorimetric data) to CMYK ink amount, interpolation and the mapping operation are used. Even if the CMYK ink amount to be obtained is existent in the gamut, the interpolation and operation for obtaining mapping may require points outside the gamut, that is, outside the ink amount space. In other words, in the present invention, there is a possibility that it is necessary to consider space outside of the gamut.

In the process for considering space outside of the gamut, first, the K plate outside of the gamut is estimated with maximum likelihood by using parameters of the same dimension as various restraint conditions (such as a chroma, brightness, or the like). The function utilized to obtain the above achromatic amount when the K plate is outside of the gamut becomes continued from the K plate inside of the gamut. Next, if the dot percent of the K plate is 0% or more and 100% or less, the color matching ink amount in the K plate can be obtained, thus obtaining CMY ink amount from outside the gamut.

Furthermore, when the dot percentage of the K plate is less than 0% or more than 100%, the imaginary CMY ink amount outside the gamut continues from inside the gamut estimated with maximum likelihood from the recurrence formula in the specified division space.

According to the present invention, even if the user selects the K plate condition arbitrarily, the selected K plate condition is the printable condition, so that arbitrary three-dimensional colorimetric data can be converted to CMYK color reproduction data under this K plate condition.

Hereinafter, respective steps of the color reproduction data conversion method of the present invention are concretely described with reference to the attached drawings.

Figure 2:
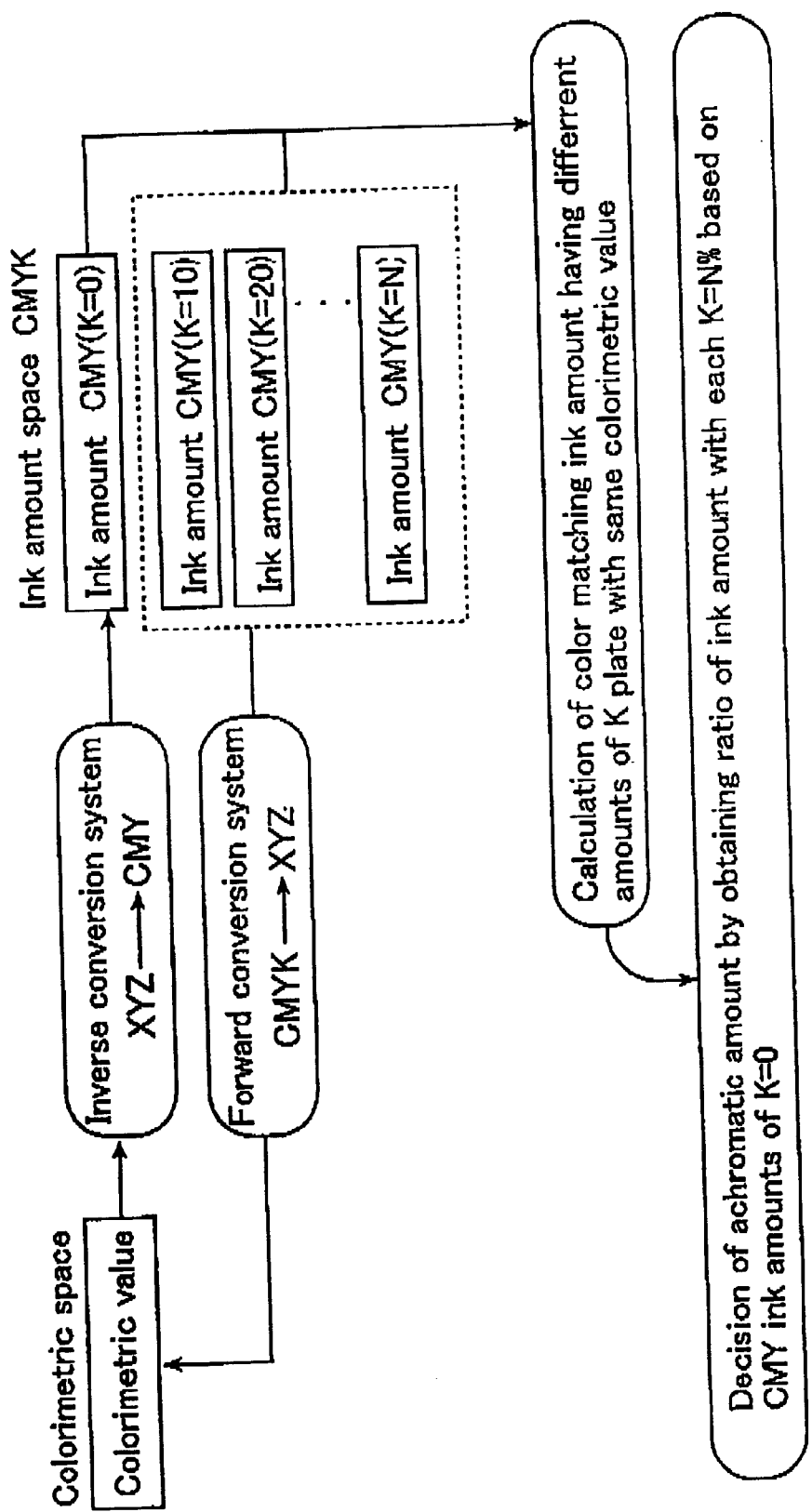
FIG. 2 is a flow chart showing one embodiment of the step for calculating achromatic quantity in the color reproduction data conversion method of the present invention.

FIG. 2 shows one embodiment of a flow chart for calculating the achromatic amount being characterized by the present invention.

First, as shown in FIG. 2, as a premise for performing the first color matching ink amount calculation step of the present invention, a color prediction function and a LUT for performing forward direction conversion from CMYK color reproduction data to colorimetric data, must be formed.

That is, in a system of reproducing with four colors of CMYK of print or the like, correlation with the color gamut which can be reproduced using four colors can be obtained beforehand as a color prediction function and LUT by making colorimetry measurements and interpolating color patches or the like printed with specified halftone dot percentages. For the sake of convenience, this correlation function is made for a four-dimensional LUT of CMYK by fractions of 10%. For example, after printing and performing colorimetry, by using a chart such as ANSI-IT8.7/3 with this correlation function, a LUT can be formed by using polynomial approximation and volume interpolation. The colorimetric data is designated by the CIEXYZ color system here.

Figure 7:
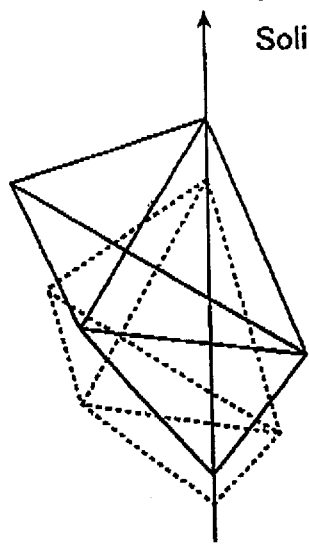
FIG. 7 is a diagram showing the color reproduction gamut in the L*a*b* space by different K plate amounts.

A method of utilizing this LUT to generate CMYK from XYZ by 3-to-4 inverse conversion is considered mathematically. As shown in the following equation (1), successive increments of CMYK for XYZ partial differentiation are obtained by a generalized matrix, so that the root can be obtained by using Newton's method. However, the color gamut for practical CMYK is not independent of the variation of the K plate, as shown in FIG. 7 (expressed in Lab space), so that portions overlapped in the same color space are present even if the K plate is different. Thus it is impossible to directly obtain the closed solution of CMYK from XYZ mathematically.

The inverse matrix solution of a 3×4 matrix with a generalized equation is shown in the following:

$$\begin{bmatrix} \Delta X \\ \Delta Y \\ \Delta Z \end{bmatrix} = A \begin{bmatrix} \Delta C \\ \Delta M \\ \Delta Y \\ \Delta K \end{bmatrix}$$

but, $$A = \begin{bmatrix} \partial X/\partial C & \partial X/\partial M & \partial X/\partial Y & \partial X/\partial K \\ \partial Y/\partial C & \partial Y/\partial M & \partial Y/\partial Y & \partial Y/\partial K \\ \partial Z/\partial C & \partial Z/\partial M & \partial Z/\partial Y & \partial Z/\partial K \end{bmatrix}$$

Here, if inverse conversion is performed mathematically, the following equation can be obtained.

$$\begin{bmatrix} \Delta C \\ \Delta M \\ \Delta Y \\ \Delta K \end{bmatrix} = A^+ \begin{bmatrix} \Delta X \\ \Delta Y \\ \Delta Z \end{bmatrix} \quad \text{Equation (1)}$$

wherein, $$A^+ = (A^t A)^{-1} A^t$$

Then, considering that the K plate is restricted in some way by the K plate restraint condition, mapping from three-dimensional colorimetric values to CMY three-dimensional color reproduction data is resolved by returning to the successive approximation and error/maximum likelihood problem. The present invention is realized by allowing the user to select a K plate substitution ratio (achromatic amount) and K plate strength, thereby attaining conversion from colorimetric data at an arbitrarily selected and printable K plate condition to CMY color reproduction values, by utilizing a linear region of K to CMY ink amount ratio or K plate substitution ratio to follow it, in the case of deciding the restraint condition from the resulting selection. In the present invention, calculations are performed only where linear and physical specifications for practical printing is guaranteed, and the arbitrary K plate is decided by giving a smooth variable amount, so that increasing or decreasing of the smooth K plate amount which is not contradicted by a print reproduction characteristic is achievable. That is, reproducible conversion can be performed in practical printing.

Here, the achromatic amount characterized by the present invention is easily obtained by the following method. Again, the colorimetric value is expressed in the CIEXYZ color system.

As shown in FIG. 2, the CMY ink amount which is the same condition as the XYZ value in K=0 (hereinafter referred to as a color matching ink amount), is obtained for 0<K≦100. In particular, as the first step of the present invention (see FIG. 1), the LUT and colorimetric measurements are used for forward conversion from the above described CMYK to XYZ, using equation (1). The CMY ink amounts are subsequently varied with a corresponding variation in the K plate amount. The variations in the K plate amount 0<K≦100 permit a series of K plate substitution ratios to be determined for a particular color patch.

In this embodiment, calculating CMY for respective discrete values of K can be done as follows. Patches showing a large number of combinations of CMYK values are printed and subjected to colorimetry to determine sets of XYZ values for the CMYK patches. Interpolation or the like is further performed to obtain sets of XYZ values for arbitrary combinations of CMYK values.

(C0, M0, Y0, 0) giving a certain set of XYZ values is determined. Then (C1, M1, Y1, 10) giving the same set of XYZ values is determined. (C2, M2, Y2, 20), . . . (C10, M10, Y10, 100) are thus determined in the same manner.

Here, (Ci, Mi, Yi, i(=k)) giving a certain set of XYZ values is determined by inverse operation of the relation between CMYK and XYZ as obtained from above. Equation 2 (below) refers to the inverse operation. The value of K is omitted in the description of Equation 2. More specifically, the relation between XYZ and CMYK is represented by the equation:

XYZ=f(C,M,Y,K).

When assuming K to have discrete values of 0, 10, 20. . . as in the preferred embodiment, XYZ is represented as follows:

$$\begin{aligned} XYZ &= f0(C, M, Y) \quad \text{at } K = 0 \\ &= f1(C, M, Y) \quad \text{at } K = 10 \\ &= f2(C, M, Y) \quad \text{at } K = 20 \end{aligned}$$

. . . .

(C0, M0, Y0, 0) is determined using XYZ=f0 (C, M, Y) in Equation 2 where the matrix J described is the differentiation of f0. (C1, M1, Y1, 10), (C2, M2, Y2, 20), . . . are sequentially determined in a similar manner. Target values of XYZ are then calculated as the same values for all the discrete values of K. Therefore, the thus obtained (C1, M1, Y1, 10), (C2, M2, Y2, 20), . . . are color-matched with (C0, M0, Y0, 0).

In this embodiment, as described above, the mapping relationship from CMYK to XYZ is maintained in the LUT of CMYK, operated every 10%, so that the variable amount of the K plate may also be calculated discretely for every 10% change. Concretely, CMY may be reverse calculated from the LUT when the operation is fixed by K=10, 20, 30, 40, . . . 100% successively, by using Newton's successive approximation method or the like, shown in the following equation (2). (Refer also to FIG. 2.)

Figure 3A:
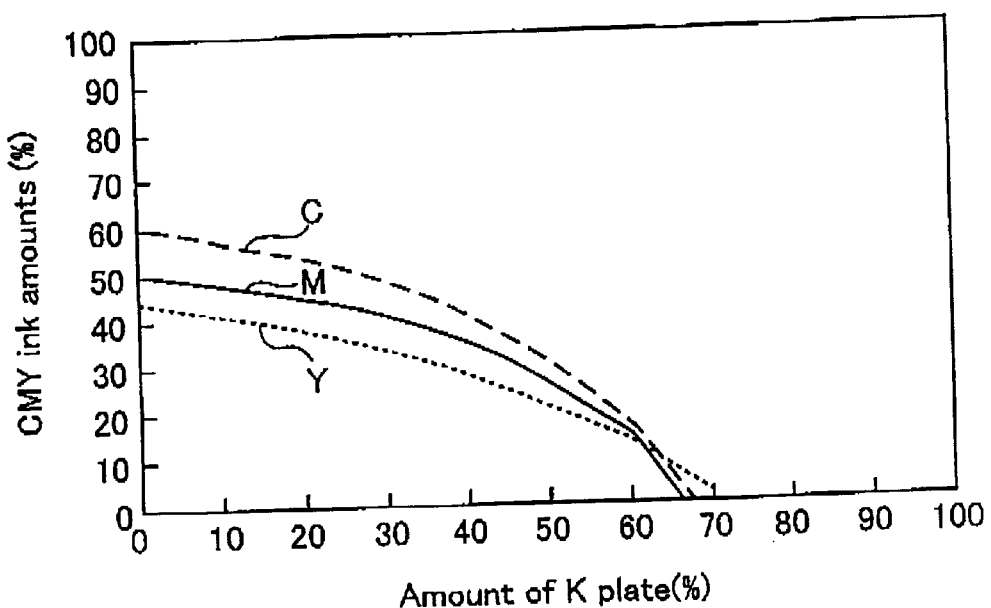
FIG. 3A is a graph for showing an example of the linear component of the relationship between the K plate amount obtained in equivalent ink amount calculating step and the CMY ink amount, in the color reproduction data conversion method according to the present invention.
Figure 4A:
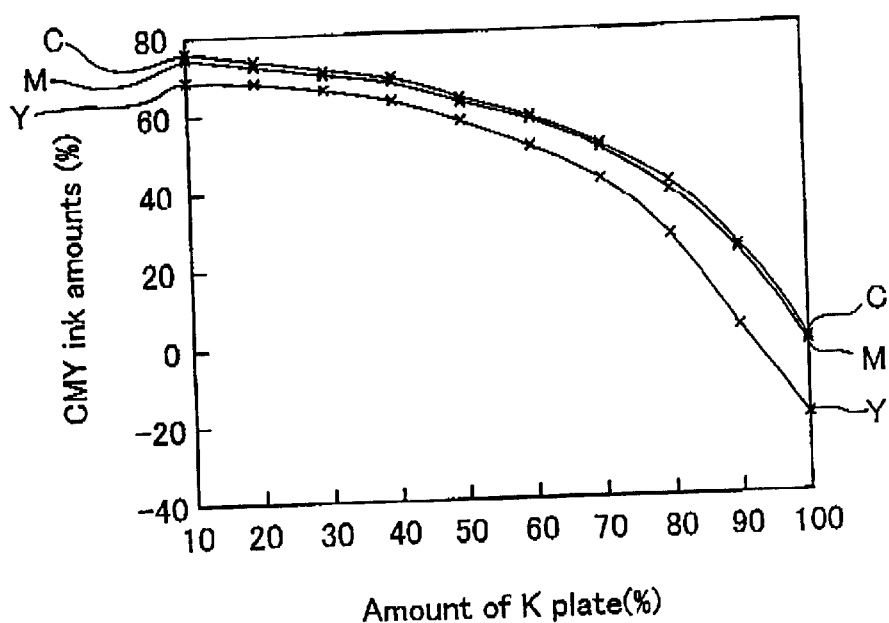
FIG. 4A is a graph showing another example of the relationship between the K plate amount obtained in the equivalent ink amount calculating step and the CMY ink amount, in the color reproduction data conversion method according to the present invention.

The relationships between the CMY color matching ink amount (%) obtained and the K plate amount (%) are shown in FIGS. 3A and 4A.

The successive approximation solution by Newton's method is shown in the following:

$$\begin{bmatrix} X_i \\ Y_i \\ Z_i \end{bmatrix} = \begin{bmatrix} \partial X/\partial C & \partial X/\partial M & \partial X/\partial Y \\ \partial Y/\partial C & \partial Y/\partial M & \partial Y/\partial Y \\ \partial Z/\partial C & \partial Z/\partial M & \partial Z/\partial Y \end{bmatrix} \begin{bmatrix} \Delta C \\ \Delta M \\ \Delta Y \end{bmatrix} + \begin{bmatrix} X_0 \\ Y_0 \\ Z_0 \end{bmatrix}$$

wherein $X_0$, $Y_0$, and $Z_0$ are initial values, and $X_i$, $Y_i$, $Z_i$ are values corresponding to the CMY to be obtained. When the following equation is provided:

$$J = \begin{bmatrix} \partial X/\partial C & \partial X/\partial M & \partial X/\partial Y \\ \partial Y/\partial C & \partial Y/\partial M & \partial Y/\partial Y \\ \partial Z/\partial C & \partial Z/\partial M & \partial Z/\partial Y \end{bmatrix}, \begin{bmatrix} \Delta C \\ \Delta M \\ \Delta Y \end{bmatrix} = \begin{bmatrix} C - C_0 \\ M - M_0 \\ Y - Y_0 \end{bmatrix},$$

the above equation is designated as follows.

$$\begin{bmatrix} X_i \\ Y_i \\ Z_i \end{bmatrix} = J \begin{bmatrix} C - C_0 \\ M - M_0 \\ Y - Y_0 \end{bmatrix} + \begin{bmatrix} X_0 \\ Y_0 \\ Z_0 \end{bmatrix}$$

Therefore, CMY becomes the following equation:

$$\begin{bmatrix} C \\ M \\ Y \end{bmatrix} = \begin{bmatrix} C_0 \\ M_0 \\ Y_0 \end{bmatrix} - J^{-1} \begin{bmatrix} X_0 \\ Y_0 \\ Z_0 \end{bmatrix} + J^{-1} \begin{bmatrix} X_i \\ Y_i \\ Z_i \end{bmatrix} \quad \text{Equation (2)}$$

And until the following equation is satisfied, the convergence point is sought while substituting in $C_0$, $M_0$, $Y_0$ of equation (2), CMY calculated from equation (2), and substituting in $X_0$, $Y_0$, $Z_0$ of equation (2), XYZ is calculated from CMY.

$$\left| \begin{matrix} C - C_0 \\ M - M_0 \\ Y - Y_0 \end{matrix} \right| \leq \varepsilon$$

Combining color matching ink amounts with changing respective discrete K plates for colorimetric values of CMY (K=0) as obtained in the first step, the present invention obtains the ink amount ratio and achromatic amount as a physical amount for describing the K plate substitution in the second and third steps.

Figure 8:
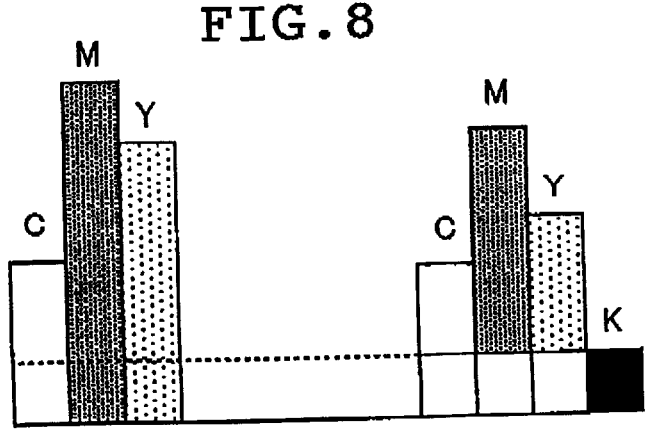
FIG. 8 is a graph showing the K plate amount equal to CMY equivalent removal amount.

Attention must be paid to the fact that the calorimetric equivalent removal amount of CMY for the K plate substitution amount is not fixed, so that the substitution balance such that the CMY equivalent amount equals K plate amount generally, as shown in FIG. 8, is not formed. Therefore, the K plate amount equivalent to the CMY plate amounts does not grow in a fixed linear relationship. This non-linear relationship has been described as achromatic theory, however, accurate substitution amounts which can be practically used in colorimetry cannot be obtained from it.

In the present invention, at certain calorimetric values of $C_0$, $M_0$, $Y_0$ (K=0) are $X_0$, $Y_0$, $Z_0$, the color matching ink amount with K=N % is shown by $C_N$, $M_N$, $Y_N$. Accordingly, the substitution ratio at this $C_N$, $M_N$, $Y_N$, $K_N$ can be defined by an equation such that, for example, R=f ($C_N$, $M_N$, $Y_N$, $K_N$)/f ($C_0$, $M_0$, $Y_0$). Herein, f shows the weighted mean and summation function or the minimum function, for example.

As described above, achromatic amount R can be obtained according to the flow chart shown in FIG. 2.

Figure 3B:
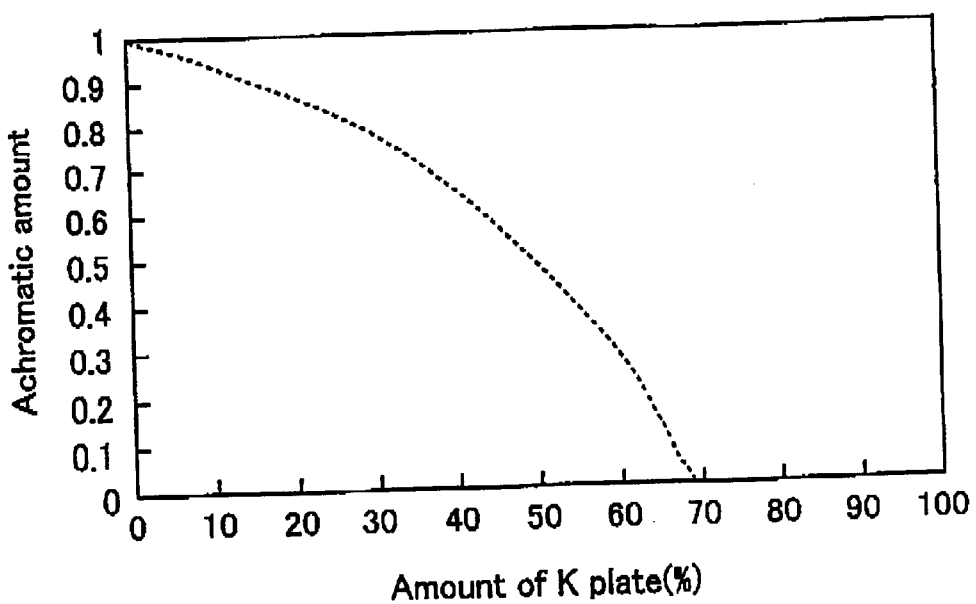
FIG. 3B is a graph showing an example of the linear component of the relationship between the K plate amount obtained in the achromatic amount calculating step and the achromatic amount, in the color reproduction data conversion method according to the present invention.
Figure 4B:
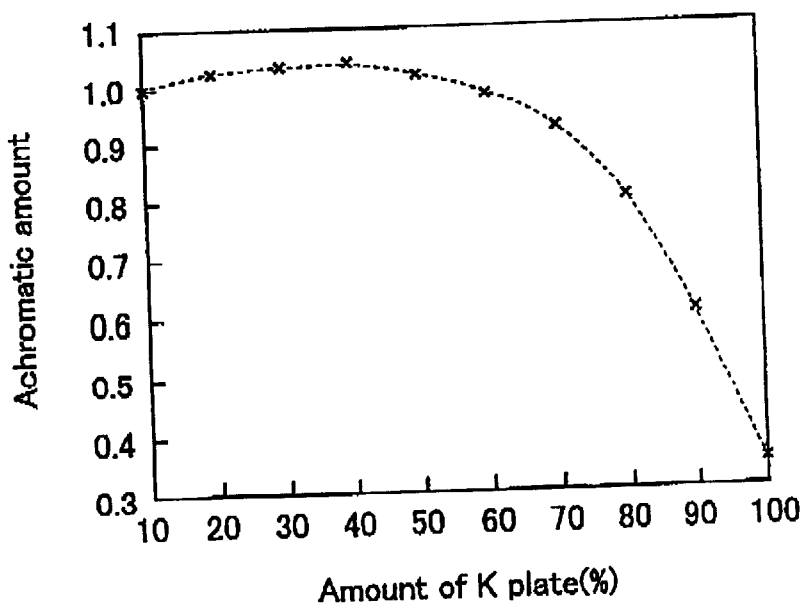
FIG. 4B is a graph showing another example of the relationship between the K plate amount obtained in the achromatic amount calculating step and the achromatic amount, in the color reproduction data conversion method according to the present invention.

The relationships between the achromatic amount R and the K plate amount (%) obtained for two different color patches are shown in FIGS. 3B and 4B. It is observed that the K plate amount and the K plate substitution amount are determined for a certain color. Once determined, the K plate amount and substitution amount need not be changed when a printing condition is consistently used. FIG. 3B is obtained from the relationship between the CMY color matching ink amount (%) and the K plate amount (%), shown in FIG. 3A (neutral gray of intermediate brightness), and is one example consisting only of the linear component that has no non-linear portion. A non-linear portion refers to a condition in which the K plate substitution ratio (achromatic amount) exceeds 1.0 and is reversed. In the example shown in FIGS. 3A and 3B, when the K plate amount increases and its increment is substituted from CMY, the total ink amount is decreased linearly. In other words, even if the K plate amount is reduced and the total ink amount increases, the ink metastasis amount increases in a substantially linear fashion.

FIG. 4B is obtained from the relationship between the CMY color matching ink amount (%) and the K plate amount (%) as shown in FIG. 4A (a dark color with great brightness), and is an example of including the non-linear portion in which the K plate substitution rate R exceeds 1.0 and is reversed.

In general, there is an unstable portion in the color space that is almost impossible to reproduce in printing, so that the achromatic amount obtained shows a non-linear characteristic for an increase of the K plate amount. For example, as shown in FIG. 4B, in the case where the K plate substitution rate (achromatic amount) exceeds 1.0 and is reversed at the time the K plate amount increases, it seems that this unfavorable phenomenon occurs in the print characteristics. As shown in FIG. 4B, the increase and decrease of the K plate substitution rate is not always linear for a given K plate amount. In the case of an ideal print, the substitution amount of CMY ink will linearly increase with an increase in K plate amount. Actually, however, there is a case when that total ink amount becomes too much, the substitution ratio becomes adversely large (more than 1.0) where the K plate amount, under the influence of a trapping and the like. In K plate generation, non-linearity on such a real print must be taken into consideration; it is not guaranteed whether a converted result can be reproduced in print accurately.

In the fourth step of the present invention (see FIG. 1), therefore, the achromatic amount function (the correlation function with the achromatic amount and the K plate amount) is defined only at the linear portion, except where the non-linear portion in such achromatic amount (K plate substitution ratio) does not become linear for the K plate amount. Accurate reproduction in print is not guaranteed in the non-linear region. In other words, the correlation function between the achromatic amount and the CMYK amount in the previously described color matching ink amount space can be approximated by a polynomial or the like, and the non-linear space must be avoided at that time. Concretely, a change of achromatic amount for an increase of the K plate amount in the above obtained arbitrary colorimetric value is approximated by a polynomial, so that when the differential inflection point, as shown in FIG. 4B, exists therein, testing is carried out to determine whether the portion of total ink amount is larger than that of the inflection portion.

In the fifth step of the present invention, as a K plate generating profile, the achromatic ink substitution ratio in color matching ink amount space for the lattice data of colorimetric space, the mapping function of the CMYK ink amount (polynomial), the restraint condition of the effective ranges thereof (linear ranges), and the like are generated. This is preferably used as a profile for K plate generation (restraint condition).

For example, the following polynomial in which the K plate amount is approximated by the achromatic amount R XYZ with the arbitrary colorimetric value as an achromatic amount function can be used. This equation approximates the inverse of the characteristics shown in the graphs of FIGS. 3B and 4B.

$$K_{XYZ} = a_1 R_{XYZ}{}^n + a_2 R_{XYZ}{}^{n-1} + a_3 R_{XYZ}{}^{n-2} + \ldots + a_n R_{XYZ} + a_{n+1} \text{ Here,}$$
$$\delta R_{XYZ}/\delta K < 0 \quad \text{Equation (3)}$$

When the variable amount of the K plate is operated at every 10% and changed discretely, the K plate amount may have only one of eleven values. Therefore, in considering degree of freedom, the maximum value of degree n may be 8. In this case, nine coefficients $a_1, a_2, \ldots, a_n, a_{n-1}$, may be decided, and these nine coefficients may be stored as a profile for K plate generation.

Although determining the coefficients for Equation 3 can be done in numerous ways, one approach is to use the step of FIG. 2 to determine the achromatic amounts R for discrete values of K (0, 10, 20. . . ) in a certain set of XYZ. In one embodiment, the achromatic amounts R for 11 discrete K values are plotted on the plane (K, R). Then, to inversely plot on the plane (K, R) of the graph, coefficients are determined in an equation of higher degree covering the 11 points on the plate (K, R) by the least-squares method. The thus obtained values are coefficients "a". This merely illustrates one of many known methods for determining a commonly used approximated curve formed of a plurality of plotted points. This approximated curve need not be a polynomial of higher degree but may be fitted with an equation representing an appropriate curve such as a spline function.

When the mapping function with a K plate substitution ratio for a calorimetric value at the three-dimensional calorimetric space and the CMYK ink amount is approximated by the above polynomial, only the coefficients required as above, for example, $(a_1, a_2, \ldots, a_n, a_{n-1})$, in addition to the linear range must be stored as a profile for K plate generation, so that the polynomial, including degrees can be easily formed and thus, the CMYK ink amount can be obtained. Of course, the CMYK ink amount mapping function is made as a LUT and may be stored as a profile for K plate generation. The 3-to-4 inverse conversion from three-dimensional colorimetric value to CMYK ink amount can be performed by using a polynomial and a LUT.

The following advantages are expected from the formation of such a profile:

At first, the achromatic amount obtained can be made a function of a simple polynomial and LUT, so that 3-to-4 conversion can be performed at an optimal condition with successive callings.

Furthermore, the selection condition is arbitrary, so long as it is a variable capable of behaving as a weight on the achromatic amount.

A method of achieving 3-to-4 inverse conversion under an arbitrary K plate generating condition that was actually suggested by a user, utilizing an above obtained profile for K plate generation, is described in detail.

In the sixth step of the present invention, the K plate generation restraint condition is formed. The K plate generating condition must be determined to perform 3-to-4 conversion. One characteristic of the present invention is that the K plate generation condition may be arbitrarily selected by the user. The main condition comprises chroma weight (if it is near to gray, K plate substitution is done powerfully), brightness weight (if the total density is large, K plate substitution is performed powerfully), K plate amount strength (limits the largest K plate amount selected), substitution strength (total K plate substitution ratio strength) or the like. However, if the achromatic ink substitution ratio can be reflected finally, any kind of condition may be used, and this can be set up for a general purpose use.

For example, FIGS. 5A, 5B, 5C, and 5D show examples of graphic user interfaces (GUIs) with total K plate substitution strength, chroma weight, maximum amount limit of K plate amount, and brightness weight selected as the K plate generation restraint condition by the user, thereby providing the user with numerous degrees of freedom for setting the K plate condition. The present invention, however, is not limited thereto.

Figure 5A:
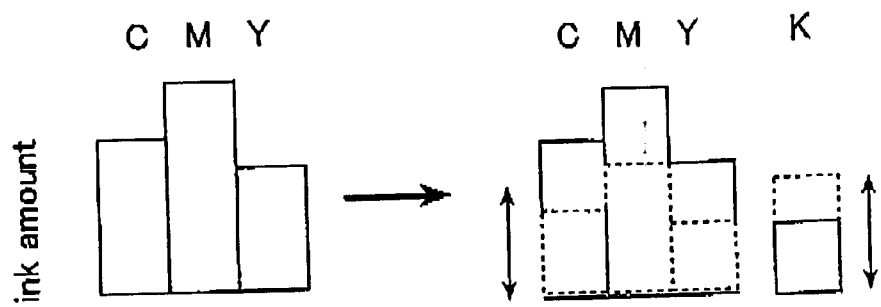
Figure 5B:
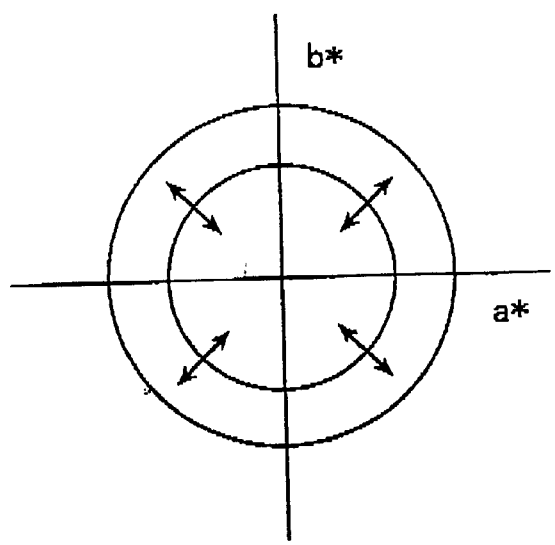
Figure 5C:
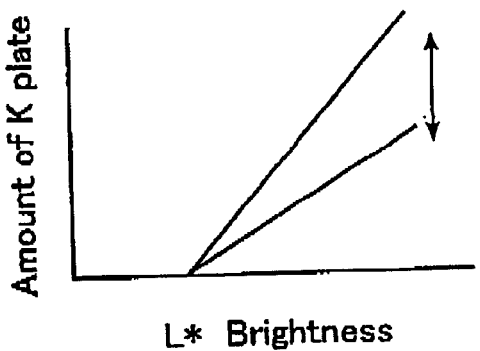
Figure 5D:
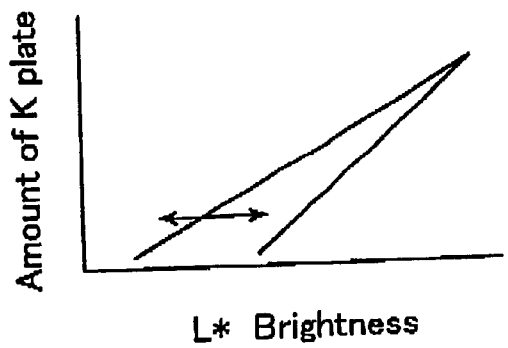

FIG. 5A shows a change of K plate substitution amount capable of being designated as the K plate substitution strength showing total K plate substitution ratio strength. For example, the K plate substitution amount is increased and decreased on the CRT by the user, according to image analytical data, and each ink amount of CMY to be substituted is increased and decreased with the predetermined substitution ratio, thereby showing an increase and decrease of each ink for residual CMY. FIG. 5B shows a change of chroma weight, designating that nearer to gray, the K plate substitution is to be done more powerfully, wherein in the a*b* plane (L*=0) of L*a*b* space showing chroma, the portion nearer to the center becomes near to gray (no coloring) and the strength of the K plate substitution is decreased and increased when a circle showing chroma weight performing powerful K plate substitution is placed far and near at its center. FIG. 5C shows the maximum amount limitation of the K plate amount; that is, a change of K plate amount strength showing a limit for deciding the maximum of K plate amount, in which the brightness L* in L*a*b* space takes on abscissa, the maximum limitation value of the K plate amount is increased and decreased when the K plate amount on the rightmost side of the brightness L* axis, where brightness is the most dim, is increased and decreased, and the K plate amount limit value at each brightness is increased and decreased, when the brightest mark of L* axis on the leftmost side is fixed. FIG. 5D shows up to which brightness the K plate is introduced, by moving where the brightness is brightest, from side to side in a figure along the L* axis, and the change of strength of the K plate amount at each brightness, in the brightness weight in which the larger the total density is, the more powerfully the K plate substitution strength is done.

Figure 6:
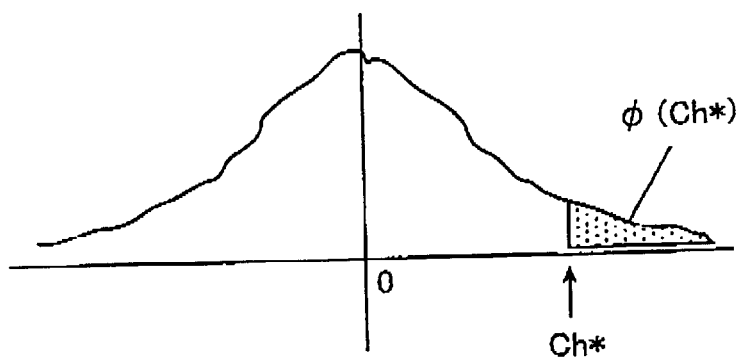
FIG. 6 is a graph showing one example of the chroma weight function used for the color reproduction data conversion method of the present invention.

For example, when the chroma weight is reflected on the achromatic amount, the function to obtain the chroma, Ch*, from the calorimetric value, XYZ, is defined as the following expression: Ch*=LCH (XYZ), so that the chroma of the colorimetric value XYZ desired to obtain the inverse mapping of the CMY ink amount can be determined. Moreover, the weight can be added on the K plate substitution in accordance with the chroma weight function (for example, regular distribution), as shown in FIG. 6.

This K plate generation restraint condition is reflected entirely by the achromatic ink substitution ratio, so that the CMYK ink amount is obtained from the data of the colorimetric space by using the mapping function defined as the K plate generation profile.

Next, the CMYK ink amount is generated in the gamut from the K plate amount by this K plate generation restraint condition.

In the sixth step of the present invention, the weight of the K plate generation restraint condition thus obtained is added to the standardization maximum K plate amount as limited in linear space (calculated from a profile for K plate generation), so that the final K plate substitution based on the user's selection condition can be obtained. For example, in this case, as shown in FIGS. 5A, 5B, 5C, and 5D, a user uses a GUI to reflect the K plate generation restraint condition, such as the total K plate substitution strength, the maximum limit of K plate amount, the chroma weighting of K plate substitution, and the brightness weighting (etc.) on the achromatic amount.

Then, in the final step of the present invention, the CMYK ink amount, under the restraint condition, can be obtained from the colorimetric value by using the correlation function of the K plate substitution in the profile for K plate generation and CMYK ink amount in linear space. Concretely, the K plate amount can be restrained at each XYZ from the profile for K plate generation, by reflecting the set weight coefficient on the profile for K plate generation (a polynomial expression).

In this way, when the K plate is fixed, the inverse mapping from the colorimetric value XYZ to the CMY color reproduction data (3-to-3 inverse conversion) can be obtained by using the above described successive approximation methods.

The above inverse mapping can be obtained accurately in the reproducible color gamut of print, and cannot be obtained outside of the gamut. That is, in the above calculation of the ink amount of CMYK, it is not calculated when the inverse mapping is judged to be outside the color gamut of the print (in the ink amount space of print, either CMYK is greater than 100% or less than 0%), so that the CMYK ink amount can not be generated outside of the gamut. However, when the mapping is performed from the CIE colorimetry data to CMYK, there are many cases in which the data outside the gamut are necessary as auxiliary points in a mathematical prediction of an interpolation operation or the like. Naturally, even if the point is an imaginary mapping point, the geometrical continuity thereof to other points in the gamut must be maintained.

Therefore, in the present invention, the increment amount of the K plate is generated so as to be continuous both inside and outside of the gamut in the colorimetric space, and if the discrete amount of the K plate is in the range from 0% to 100%, the color matching ink amount is obtained in the K plate amount.

In order to continue the increased amount of the K plate outside and inside the gamut in the colorimetric space, a maximum likelihood equation having a dimension of the restraint condition given to the achromatic amount (chroma, brightness) is assumed with the data in the gamut, thereby obtaining the K plate amount outside of the gamut. When the amount of the K plate is less than 0% or greater than 100%, the color matching ink amount can not be calculated. Therefore, the colorimetric space is divided into arbitrary blocks (divided on the L* axis), and the recurrence formula is assumed on the basis of data in this divided space, thus obtaining a continuous virtual CMYK amount.

In this way, the arbitrary K plate weight coefficient is reflected on the achromatic amount, so that the K plate amount can be fixed and a closed solution of inverse mapping to CMY space by using successive approximation from the colorimetric value is obtained, thus the inverse conversion from XYZ to CMYK can be performed under the arbitrary K plate condition by the selection of the user.

As described above in detail, by considering the stability of the color reproduction and the security of precision on gray due to the equivalent K plate substitution equivalent to the calorimetric color reproduction chosen by the user, the stabilization of the print by balance distribution of total ink amount, and expansion of the maximum density range, the K plate condition can be selected arbitrarily with three-dimensional colorimetry data while maintaining calorimetric reproduction conditions. The selected K plate condition can be made a printable K plate condition on the basis of the physical amount of the achromatic amount in the ink amount space, so that the color reproduction data of four colors of CMYK can be obtained by performing an inverse conversion from three-dimensional calorimetric data under the K plate condition capable of printing and ensuring arbitrary selectivity.

Next, the color reproduction data conversion method of the second embodiment of the present invention is described with reference to FIGS. 9–12 in detail.

The second embodiment of the present invention has, initially, an indispensable condition that in the case of converting three-dimensional colorimetric data into four-dimensional color reproduction data for print (CMYK), the K plate condition can be decided arbitrarily while maintaining colorimetric reproduction conditions, in order to generate the K plate for attaining the previously described printing purpose of stabilizing printing. It also has another indispensable condition that it is necessary to select the parameter most suitable for every image in order to determine the K plate condition, so that the best K plate generating condition can be established, without a user being aware, by automatically generating the most suitable four-color (CMYK) balance from an infinite number of CMYK balance equivalents to the calorimetric color matching in order to suppress the color difference fluctuation in print, as well as minimize the locality in the image plane.

A print is attained with four colors of CMYK, and generally, it is impossible to obtain a strict solution of the mapping from colorimetric space data such as CIEXYZ and Lab represented with the three-dimensional to four-dimensional space, so that some restraint condition is necessary in order to obtain the mapping. According to the present invention, the most suitable K plate restraint condition is established automatically on the basis of stability as the print is effected, and is dependent on the image, thereby attaining the mapping conversion from three-dimensional color space to four-dimensional color space.

Figure 9:
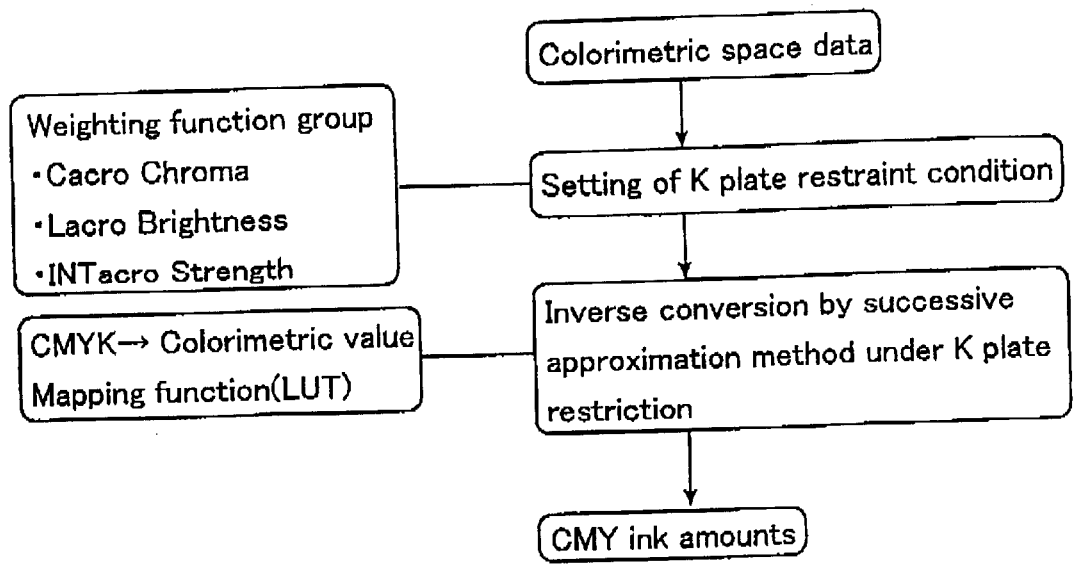
FIG. 9 is a flow-chart showing one example of a color reproduction data converting method according to the present invention.

FIG. 9 shows a flow chart of the second embodiment of the present invention.

In this embodiment, as shown in FIG. 9, the K plate restraint condition is initially established from three-dimensional colorimetric space data. In the following explanation, the resent invention describes the above K plate substitution ratio (achromatic amount) as a typical K plate restraint condition, but the present invention is not limited thereto. For example, as the K plate restraint condition, any kind of condition may be used, including K plate substitution itself, and the K plate mixing ratio (such as the mixing ratio of the K plate, namely the ratio at which the K plate is mixed with CMY) may be used as long as the K plate amount can be finally set up in the case of conversion into the CMYK color reproduction data. The 3-to-4 conversion from three-dimensional colorimetric space data to the CMYK color reproduction data can be possible with a restraint set on the K plate amount.

The K plate substitution ratio, used as the K plate restraint condition in the present invention, comprises a ratio between the total ink amount of CMY (the basic ink gross amount) in the case of K=0% and the total ink amount of CMYK in a K plate equivalent in color to the three-dimensional calorimetric space data (for example, XYZ value). In order to decide such a K plate substitution ratio, first, the color matching ink amount is calculated in each ink amount; then, the total ink amount at each ink amount is obtained; and further, a ratio between the total ink amount being a reference amount of the K plate amount under a certain color condition (for example, K=0%) and the total ink amount ratio different from each K plate amount, may be obtained as the K plate substitution ratio. In the present invention, moreover, it is preferred that the relationship between the thus obtained K plate substitution ratio and the K plate amount is obtained as a function, and defined as a K plate substitution ratio function. The color matching is described above.

The most characteristic portion of the second embodiment of present invention is the selection of a suitable parameter for every image by setting up the K plate restraint condition in order to obtain the inverse mapping from three-dimensional colorimetric space to four-dimensional device space (CMYK).

That is, in the setting of the K plate restraint condition according to the present invention, image analytical data is provided from the three-dimensional colorimetric space data. Based on the print stability for the image analytical data, the thus obtained most suitable K plate control amount, obtained by experimentation or the like, is selected as a parameter reflected to the K plate restraint condition. The K plate control amount used for the present invention includes at least the K plate substitution amount and the K plate maximum amount, and the color space weight, such as chroma weight and/or brightness weight, may be included. The reflection to the K plate restraint condition of the K plate control amount is the weighted coefficient of the K plate control amount, for example, the weighted function group of the substitution strength function (INT acro), such as the K plate substitution amount and the K plate maximum limitation amount, the chroma weight function (Cacro) and the brightness weight function (Lacro). Other K plate control amounts may be adopted.

The image analytical data used in the present invention includes not only the gray histogram (the gray component ratio), but the basic ink total amount (CMY ink amount) and the maximum brightness as well as the minimum brightness. Moreover, in the present invention, the relationship between the image analytical data and the most suitable K plate control amount must be obtained based on printability and stability by previous experiment or the like. Stability is where the color difference fluctuation between every number of sheets and locality in a respect are held to a minimum. The relationship between the image analytical data and the most suitable K plate control amount is described later.

In the present invention, when the K plate substitution ratio is used as a K plate restraint condition, the K plate control amount most suitable as a parameter reflected in the image analytical data obtained from three-dimensional calorimetric data is obtained. The weighting of the K plate substitution ratio is performed by using the thus obtained most suitable K plate control amount, so that the K plate substitution ratio is obtained from the K plate control amount, and the K plate substitution function is thus established as a K plate restraint condition for 3-to-4 conversion from three-dimensional color space (colorimetry data) to four-dimensional color space (CMYK color reproduction data).

In this way, when the most suitable K plate restraint condition, for example, the K plate substitution ratio decided above, can be set up based on printability and stability, then as shown in FIG. 9, the 3-to-3 inverse conversion from three-dimensional colorimetric space to three-dimensional color reproduction system of CMY is performed under the most suitable K plate restraint condition established. That is, first, the K plate amount is restricted; then, the 3-to-3 inverse conversion is performed for the K plate amount thus restricted, using the successive approximation method or the error minimization method, utilizing the forward normal lattice mapping function (for example, LUT) for performing forward conversion from the system for reproducing with four colors of CMYK to the three-dimensional colorimetric space.

Moreover, the ink amount of CMYK to be obtained must be present in the effective reproduction area (color gamut of print). That is, this process must be performed in the effective reproduction area.

As described above, the forward normal lattice mapping function, the three-dimensional calorimetric data and the four-dimensional color reproduction data are not limited in the present invention.

In this way, the printable K plate generating condition, taking printability and stability into consideration, can be established automatically from the three-dimensional calorimetric data of a subject image in the effective reproduction effective range, without the user being required to employ prior empirical knowledge, so that the four-dimensional color reproduction data (CMYK ink amounts) can be obtained with color matching produced from the four-colored balance, in order to suppress the color difference fluctuation in every number of sheets in print and the locality in the printing plane (variations in color amongst different localities in the printing plane) to a minimum.

In the present invention, as described above, it is necessary to form the forward normal lattice mapping function (LUT) as a premise of performing 3-to-3 inverse conversion. As described above, this forward normal lattice mapping function can be formed as a color prediction function and LUT. Moreover, the feature that the CMYK is obtained from XYZ via 3-to-4 inverse conversion is possible by using the inverse matrix solution with the above equation (1). However, as also described above, it is impossible to obtain a closed, unique solution.

Therefore, as described above, the K plate must be restricted in some form, and under its K plate restraint condition, the above function is resolved by making the successive approximation and error maximum likelihood problem return to the mapping from three-dimensional calorimetric value to the three-dimensional color reproduction data of CMY.

Specifically, for example, it can be easily resolved by the following method. In addition thereto, the colorimetric value is also expressed in the CIEXYZ color system.

The ink amount of CMY color matched to one XYZ value is calculated discretely (for example, at 10% intervals) in the range of $0<K\leq100\%$. According to the K plate restraint condition, such as the mixing ratio of the previously determined K plate, if the K plate is fixed in an effective reproduction area from the maximum value of K (K=100) to the minimum value of K (K=0), the amount of CMY accompanied herewith can also be obtained by interpolating the amount of CMY obtained with the amount of the discrete K plate with the reflection to the mixing ratio of the K plate. In order to obtain the CMY from the XYZ as the inverse mapping of the forward normal lattice LUT, as shown by equation (2), an error minimization problem, such as Newton's successive approximation method, can be easily solved with the appropriate solution method.

Next, the most characteristic decision method of the K plate restraint condition according to the present invention is described. In the first place, as described above, in the case of printing, the CMYK resolution condition of calorimetric color matching does not have a unique solution. The object of obtaining the unique resolution condition by restricting the amount of the K plate under the color reproduction characteristics inherent in printing, has mainly the following points.

1) The color reproduction fluctuation of print is suppressed.
2) The total consumption of ink is suppressed, which keeps costs down.
3) The reproduction of neutral color (achromatic color) is guaranteed.

That is, stable printed matter, low cost, and high quality can be obtained by seeking the K plate amount restraint condition for meeting the above conditions while maintaining calorimetric reproduction.

The present inventor found through experimentation with the present invention that there is a strong correlation between the stability, such as the fluctuation of color difference across the number of sheets, and the locality in the printing plane. The present inventor further observed a relationship between the analytical data value of an image, and the setting value of the K plate substitution ratio decision parameter group, such as the amount of the K plate substitution, which is mentioned as the amount of the K plate control (condition) and the amount of color space weight, such as the chroma weight, the brightness weight, and the strength weight, or the like, such as the amount of maximum limitation. Then the strong correlation may be expressed in a function, and the K plate amount restraint condition is set up automatically, so that four color conversion can be easily performed, attaining the above objectives.

FIG. 8 shows the relationship between the amount of the K plate substitution and the amount of the CMY ink graphically. In the present invention, as shown in FIG. 8, the amount of the K plate substitution may be an amount of the calorimetric equivalent removal of CMY. However, as previously stated, the amount of the calorimetric equivalent removal is not strictly constant for the amount of the K plate substitution. As shown in FIG. 8, the substitution balance, such as the amount of equivalent removal being equal to the amount of the K plate, is generally not established. Therefore, in the present invention, the amount of the K plate is obtained from the K plate substitution ratio function formed by making the relation between the amount of K plate and the ratio of K plate substitution in a function, with the use of the ratio of the K plate substitution is defined by a ratio of the basic ink total amount and the total amount of CMYK due to the amount of the color matching ink in the predetermined amount of the K plate, so that the amount of accurate substitution, which was calorimetric and was alike in practical use, can be obtained.

In the second embodiment of the present invention, similar to the first embodiment, the amount of the K plate substitution; the amount of the K plate maximum limitation; the amount of color space; or the like, such as the chroma weight or the brightness weight, are used as the amount of the K plate control (the K plate generation restraint condition) having strong correlation to the image analytical data. As long as there is a correlation to the image analytical data and the ratio of achromatic ink substitution can be finally reflected, any kind of amount and any kind of conditions may be used, and thus the use is general purpose.

For example, as an amount of the K plate control (the K plate generation restraint condition), the amount of the K plate substitution, the weight, the amount of the K plate maximum limit, and the brightness, as shown in FIGS. 5A, 5B, 5C, and 5D, can be used in one embodiment of the GUI shown on the CRT, but the present invention is not limited thereto.

Figure 12:
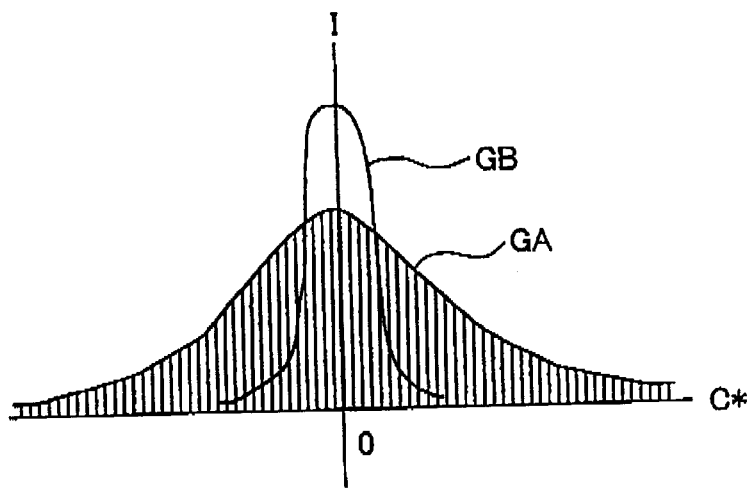
FIG. 12 is a graph showing one example of a chroma weight function used in the color reproduction data conversion method according to the present invention.

There is a strong correlation between the parameter group (amount of K plate control) for restricting such an amount of the K plate and the analytical data of the image for the above described stability. The ratio of the gray ingredient in picture qualities is explained as analytical data of the image by a preferred embodiment. As shown in FIG. 12, the ratio of gray element is taken discretely, and is estimated by using the two parameters of the median (center) and the half-width ($\delta$), designated by its envelope. The median of the gray histogram shows the deflection of color, and its half-width shows some of an ingredient. For example, the gray histogram, GA, having a large half-width and wide tails shows various kinds of colors, and the sharp gray histogram, GB, having a small half-width and narrow tails is nearly colorless. Moreover, the method for deciding the ratio of the K plate substitution and generating four color separated CMYK plates utilizes the above described Newtonian successive approximation method.

Figure 10A:
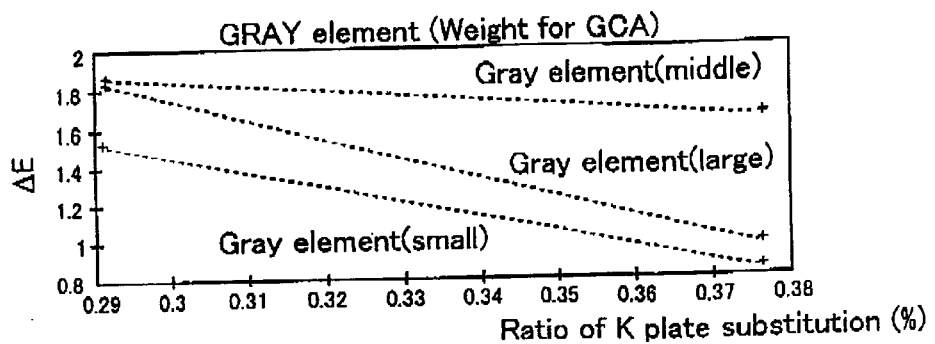
FIGS. 10A, 10B, 10C, and 10D are graphs showing fluctuations of the color difference ΔE for the K plate substitution ratio and gray component histogram as to the gray element and pure color element in the case of changing the K plate substitution strength by chroma in the color reproduction conversion method according to the present invention, respectively.
Figure 10B:
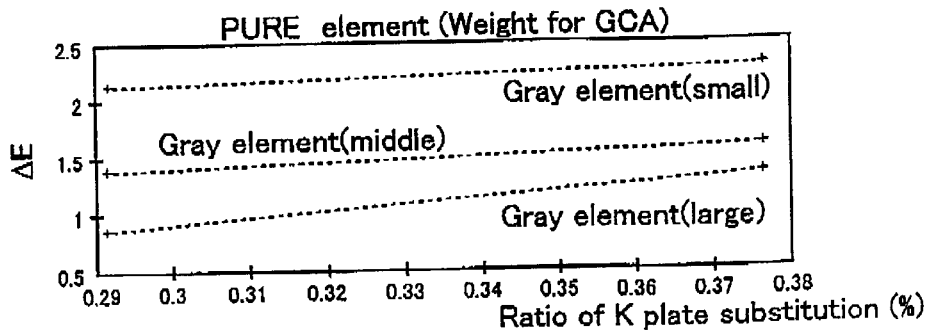
Figure 10C:
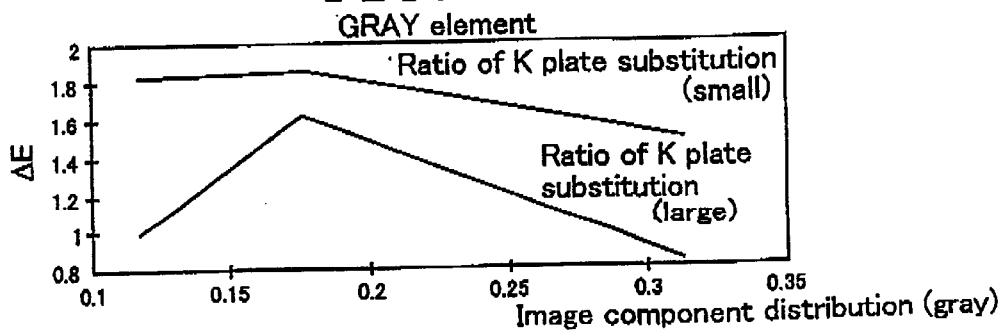
Figure 10D:
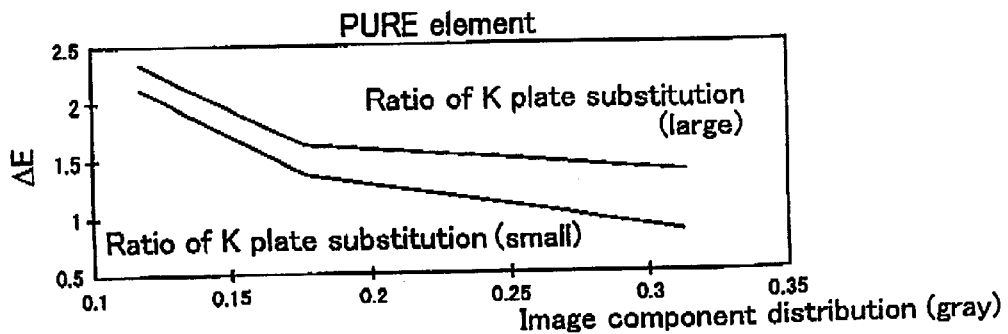

There is also a relationship between stability in the print and the fluctuation of a place in one print sheet with the ratio of its K plate substitution, and this relationship has a different correlation to the ratio of gray in the image. This relationship is different even with respect to different colors in the picture that should be emphasized. This status is shown in FIGS. 10A and 10B. As is seen from FIGS. 10A and 10B, it is found that the function of the fluctuated color difference ($\Delta E$) in print for the ratio of the K plate substitution describes a different curve than the ratio of gray ingredient in the image. Also, this function varies depending on which color is emphasized in ascertaining the color difference $\Delta E$. Therefore, it is found that the function of the fluctuation in print to the ratio of K plate substitution is also different than the ratio of the gray element in the graphic pattern. FIGS. 10C and 10D are replotted for the correlation of fluctuation of print for the respective gray elements against FIGS. 10A and 10B. According to these figures, the most suitable (most stable in print) ratio of the K plate substitution can be automatically selected from the table (or its functionalized equation) shown in FIGS. 10C and 10D. In the case of this embodiment, the most suitable ratio of K plate substitution corresponds to at least the gray center or color center of other pure colors. The K plate substitution ratio can also be set by selecting which is the ratio of gray ingredient or which is the ratio of gray ingredient of a print image, or which object corresponds to an important point within the image.

Herein, FIGS. 10A, 10B, 10C, and 10D plot the stability change (Lab color difference $\Delta E$) in the case of subjecting the ratio of the K plate to the strength change in chroma (the whole). FIGS. 10A and 10B plot the stability change in the case of taking the ratio of the K plate substitution as an abscissa. FIGS. 10C and 10D plot the stability change for analysis result (gray element histogram) of the image. FIGS. 10A and 10C plot the fluctuation as to gray (GRAY) patches. FIGS. 10B and 10D plot the fluctuation as to other pure color batches (PURE).

It is found from FIGS. 10A, 10B, 10C, and 10D, that if the ratio of K plate substitution is high, the gray color and the pure color are exchanged in a stable manner; if the ratio of gray element in the image is changed, the stability is exchanged in the same ratio of the K plate substitution.

Figure 11A:
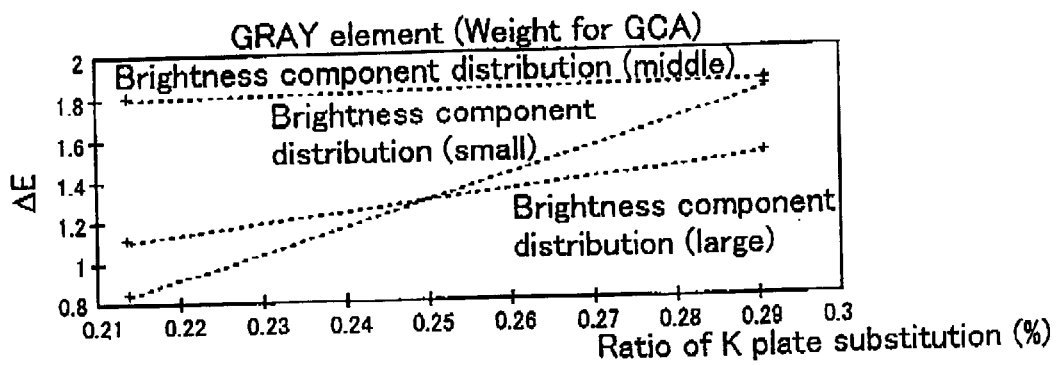
FIGS. 11A, 11B, 11C, and 11D are graphs showing fluctuations of the color difference ΔE for the K plate substitution ratio and gray component histogram as to the gray element and pure color element in the case of changing K plate substitution strength by brightness distribution in the color reproduction data conversion method according to the present invention, respectively.
Figure 11B:
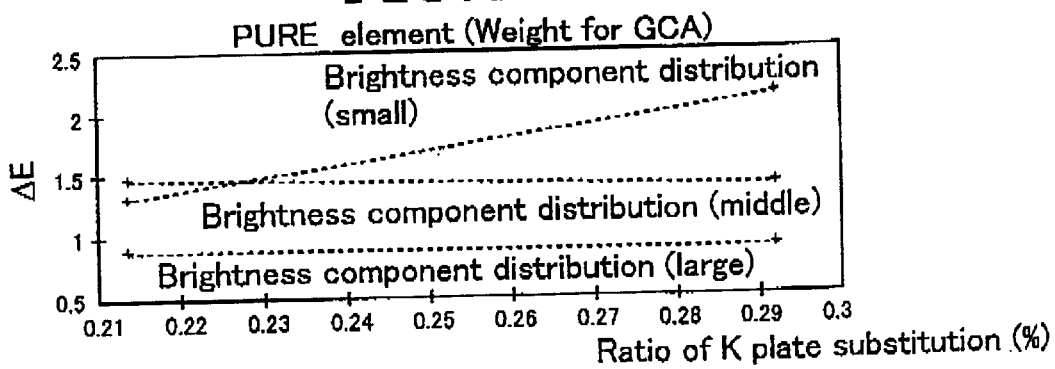
Figure 11C:
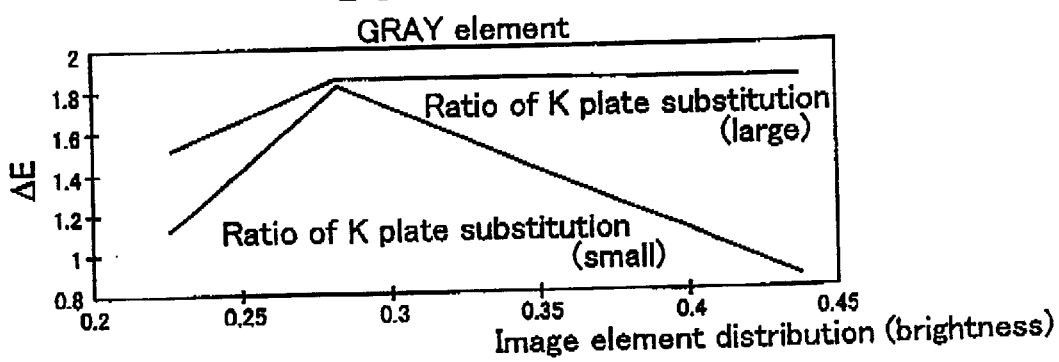
Figure 11D:
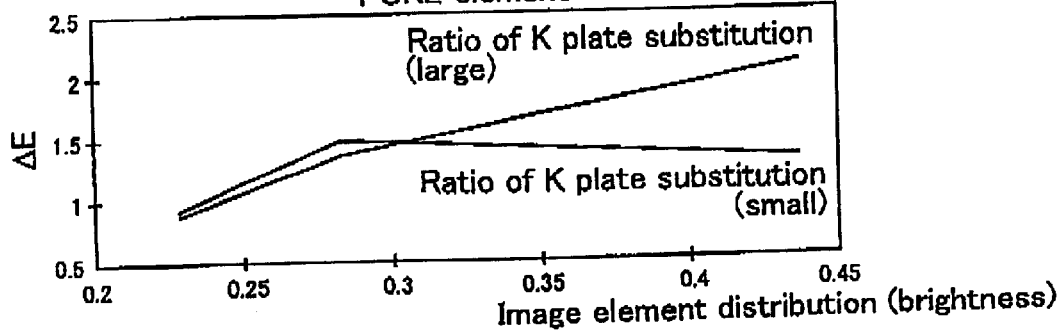

Moreover, FIGS. 11A, 11B, 11C, and 11D plot the stability change (Lab color difference $\Delta E$) in the case of subjecting the ratio of the K plate substitution to the strength change in lightness distribution in the same manner as in FIGS. 10A, 10B, 10C and 10D. That is, FIGS. 11A and 11B plot the stability change in the case of taking the ratio of the K plate substitution as an abscissa. FIGS. 11C and 11D plot the stability change for the analysis result (gray element histogram) of the image. FIGS. 11A and 11C plot the fluctuation as to gray patches (GRAY). FIGS. 11B and 11D plot the fluctuation as to other pure color batches (PURE).

It is found from FIGS. 11A, 11B, 11C, and 11D that if the ratio of K plate substitution is changed with the brightness distribution, this change becomes large as the brightness distribution becomes narrow.

As is seen above, according to the present invention, it is decided which image color (gray, or a pure color, or other specified color) is paid attention to from the image analytical data (the gray element, the histogram of brightness, the maximum density, the minimum density), so that the amount of most suitable K plate control and the condition (the amount of K plate substitution and the amount of K plate limitation (K plate substitution strength), the brightness weight and chroma weight (the amount of color space weight)) capable of being printed most stably, can be selected automatically. Therefore, the amount of the K plate substitution becoming the K plate restraint condition can be controlled from image analytical data.

By utilizing the thus selected K plate restraint condition, the four color separation data which were an indefinite solution in going from three dimensions to four dimensions can be obtained from three-dimensional calorimetric data as a solution orthogonalized from 3 dimensions to 4 dimensions with successive approximation method and maximum likelihood approximation method. The obtained four color separation condition stores calorimetrically the original three-dimensional data so that the most stable reproducibility can be guaranteed as to the object which requires the most attention in print.

As to the fluctuation in the print surface of the printed matter, the same data can be obtained so that the correlation table can be made. Therefore, even in the case that the picture paid attention to is the gradation and the picture in the screen tint in which the print surface occupation rate is very high and the frequency element is low, a minimum fluctuation K plate restraint condition may be selected.

Then, in the above description, as the K plate restraint condition, the ratio of the K plate substitution represented as the ratio of ink amount is used as the actual amount to describe the amount of K plate substitution, from a combination of the ink amount of color matching, wherein each K plate is changed discretely for the colorimetric value of CMY (K=0), so that the amount of K plate substitution is obtained discretely and comprehensively, from the combination of CMY ink equivalent to metamerism by the amount of K plate substitution, thereby performing the mapping from XYZ to CMYK for the ratio of an arbitrary K plate. As described above, when the calorimetric value of $C_0, M_0, Y_0$ (K=0) is $X_0, Y_0, Z_0$, the amount of color matching ink with K=N % is shown by $C_N, M_N, Y_N$. That is, the amount of K substitution can be defined as $R=f(C_N, M_N, Y_N, K_N)/f(C_0, M_0, Y_0)$ or the like. Here f shows the weighted mean and summation function or the minimum function or the like.

When the thus obtained ratio of K plate substitution R is defined as a linear function of the rate of K plate substitution in which the amount of K plate substitution, KN, is variable, and the reproducible ink amounts of CMYK for the amount of arbitrary K plate substitution, KN, can be obtained. Generally, since the unstable portion of color reproduction is nearly impossible to print, but is present in the color space, the ratio of K plate substitution, R, provided here may show a non-linear characteristic for a change of K plate amount. For example, when the K plate amount is increased, the ratio of K plate substitution (achromatic amount) exceeds 1.0 and seems to reverse. In this case, the characteristic print is thought to be unpleasant.

In the case of generating the K plate, such non-linearity of a real print needs to be considered. That is, it is not guaranteed whether that a result can be accurately reproduced in print. Therefore, in the present invention, it is preferable to define the ratio of the K plate substitution function (correlation function with the amount of K plate substitution and the amount of K plate) only with a linear portion. Where such a ratio of K plate substitution function (achromatic amount) is not linear for the amount of the K plate, the non-linear portion is not guaranteed to print accurately. Moreover, in the present invention, the correlation function with the ratio of K plate substitution and the amount of CMYK in the amount of color matching ink space stated above may be approximated with a polynomial, but the non-linear space needs to be avoided at this time. Concretely, the change of the K plate substitution ratio for an increase of K plate amount in the arbitrary colorimetric value demanded is approximated with a polynomial, and then, when the inflection point on the differential calculus exists in the polynomial, the inspection may be done in such a way that the portion where the total ink amount is more than the inflection point takes off from the data.

Moreover, in the present invention, the restraint conditions, such as the mapping function (polynomial) with the achromatic ink substitution ratio and CMYK ink amounts in the color matching ink amount space for lattice data of calorimetric space and the effective (linear) range of the mapping function may be used as a profile for K plate generation (restraint condition). Therefore, as in the first embodiment of the present invention, the polynomial shown by the above equation (3) in which the K plate amount is approximated by the K plate substitution ratio (achromatic amount) R XYZ at an arbitrary colorimetric value, as the K plate substitution ratio (achromatic amount) function may be used in the second embodiment of the present invention. The coefficients of such a polynomial and the mapping function made in LUT are stored as the K plate generation profile, so that the 3-to-4 conversion can be effected easily and effectively as in the first embodiment of the present invention. Also, in this embodiment, data from outside the color gamut of the print, which are necessary in the case of performing the mapping from CIE colorimetry data to CMYK, can be obtained as the virtual CMYK amounts which continue geometrically for points within the color gamut.

As described in detail, according to the second embodiment of the present invention, by considering the stability of color reproduction and security of precision on gray due to the equivalent K plate substitution that is equivalent to calorimetric color reproduction aimed to print by the user, stabilization of the print by balance distribution of total ink amount, and expansion of the maximum density range, the K plate condition can be decided voluntarily with three-dimensional colorimetry data while maintaining calorimetric reproduction conditions, and the most suitable parameters for every image can be selected in case of deciding the K plate condition. Particularly, when the inverse conversion is performed from the three-dimensional data, such as the conversion from colorimetric values to the four color separation data CMYK under the K plate generation condition selected voluntarily while maintaining color matching, the K plate is automatically established on the basis of printability and stability of the interest image without the empirical skill of use, and then four-dimensional color reproduction data is separated into four colors which are simple and most suitable to the four colored print.

The present invention describes the color reproduction data conversion method as to the above described embodiments in detail, but the present invention is not limited to these embodiments, and various changes or modifications may be made in design without departure from the scope of the invention.

What is claimed is:

1. A color reproduction data conversion method to convert three-dimensional colorimetric data into four-dimensional color reproduction data containing color components of cyan (C), magenta (M), yellow (Y), and black (K), while maintaining a metamerism, comprising:

performing an inverse conversion from a three-dimensional calorimetric space to a three-dimensional CMY color space for a plurality of different K plate amounts in order to obtain as color matching ink amounts, those ink amounts of CMY colors being metamer with the three-dimensional calorimetric data and setting a reference K plate amount with respect to the plurality of K plate amounts;

obtaining a ratio between the total ink amount of CMYK for each K plate amount and the total ink amount of CMYK in the case of the reference K plate amount as an achromatic amount of the K plate;

obtaining an achromatic amount function for said amount of the K plate in a linear portion by examining a portion in which said achromatic amount becomes non-linear for the K plate amount;

generating a mapping function from the three-dimensional colorimetric data and the achromatic amount to the ink amounts of CMYK in the linear portion and obtaining a K plate control condition to be used as a weighting coefficient for reflecting the K plate control condition to the achromatic amount successively in order to perform a weighting to the achromatic amount with said K plate control condition previously selected;

determining the achromatic amount from the achromatic amount function and the selected K plate control condition as a restraint condition for the inverse conversion from three-dimensional calorimetric data to four-dimensional color reproduction data;

calculating ink amounts of CMYK from the thus determined achromatic amount and the three-dimensional colorimetric data with the use of said mapping function; and printing an image based on the calculated ink amounts.

2. A color reproduction data conversion method as claimed in claim 1, wherein said K plate control condition includes at least a K plate substitution amount, a maximum K plate limit, a chroma weight, and a brightness weight.

3. A color reproduction data conversion method as claimed in claim 1 or 2, wherein said inverse conversion from the three-dimensional colorimetric space to the three-dimensional CMY color space as to the plurality of the different amounts of the K plate is performed based on a forward conversion from the four-dimensional CMYK color space to the three-dimensional colorimetric space obtained by interpolation calculated by making colorimetry with specified color patches.

4. A color reproduction data conversion method as claimed in claim 1 or 2, wherein at least one of the CMYK ink amount mapping function and an achromatic amount limit of the achromatic amount function performs a K plate generation by storing as a profile of K plate generation of an amount previously obtained, and by making successive calling.

5. A color reproduction data conversion method as claimed in claim 1 or 2, wherein, when a point of a color gamut outside of a print is required for calculation of the ink amount of CMYK, the K plate outside the color gamut is estimated with maximum likelihood by using a parameter of the same dimension as the restraint condition used for calculation of said achromatic amount in such a way that the K plate outside the color gamut becomes continued from the K plate inside the color gamut, and then, if the thus assumed K plate is no less than 0% and no more than 100%, the CMY ink amounts outside the color gamut are obtained by obtaining the color matching ink amounts in the assumed K plate, and if the assumed K plate is less than 0% or more than 100%, the imaginary amounts of CMY ink outside the color gamut continuing from inside the color gamut are estimated from a recurrence formula in a specified division space.

6. A color reproduction data conversion method for converting three-dimensional calorimetric data into four-dimensional color reproduction data containing color components of cyan (C), magenta (M), yellow (Y), and black (K), while maintaining metamerism, comprising:

setting up a restraint condition on a K plate, and obtaining the mapping of three-dimensional color reproduction data of CMY from the three-dimensional colorimetric data by using a forward normal lattice mapping function of three-dimensional calorimetric data from the four-dimensional color reproduction data of CMYK using successive approximation or error minimization methods;

wherein a K plate control amount is included as a parameter reflected to said restraint condition of the K plate, and a suitable value of said K plate control amount is established by previous experiment for print stability for image analytical data; and wherein said K plate control amount is selected from at least one of: a K plate substitution amount and a K plate amount of maximum limit, and the image analytical data contains at least a gray histogram; and printing an image based on the K plate control amount in conjunction with the mapping of three-dimensional color reproduction data of CMY.

7. A color reproduction data conversion method as claimed in claim 6, wherein said K plate control amount includes further at least one of chroma weight and brightness weight.

8. A color reproduction data conversion method as claimed in claim 6 or 7, wherein said image analytical data includes a basic ink gross amount of CMY, a maximum brightness and a minimum brightness.

9. A color reproduction data conversion method as claimed in claim 6 or 7, wherein said forward normal lattice mapping function is obtained by subjecting specified color patches to colorimetry and by performing the forward conversion obtained by an interpolation calculation from four-dimensional CMYK color space to three-dimensional colorimetric space.

10. A color reproduction data conversion method as claimed in claims 6 or 7, wherein said K plate restraint condition is a K plate substitution ratio for each amount of the K plate which is defined as a ratio between a total amount of CMYK in each amount of the K plate and a total amount of CMY in the case of the K plate amount being a reference amount, and wherein said K plate substitution ratio for each K plate amount is obtained by performing inverse conversion from a three-dimensional colorimetric space to a three-dimensional CMY color space as to a plurality of different amounts of the K plate, including the reference amount with the use of the forward normal lattice mapping function to obtain ink amounts of CMY colors being metamer with the three-dimensional colorimetric data, and increase of the amount of the K plate being the reference amount as to the plurality of the different amounts of the K plate, thereby obtaining the ratio between the total amounts of CMYK for each K plate amount thus obtained and in case of the K plate amount being the reference amount.

11. A color reproduction data conversion method as claimed in claim 10, wherein
  said K plate substitution ratio comprises a K plate substitution ratio function being a variable of the K plate amount in an effective reproduction area, and said K plate control amount is obtained as a weighting coefficient reflected to successive K plate substitution ratios in order to perform a weighting to the K plate substitution ratio, wherein
  said setting of the K plate restraint condition is performed in such a way that a suitable K plate control amount is obtained as a parameter reflected to the K plate restraint condition for image analytical data obtained from the three-dimensional colorimetric data, the K plate substitution ratio is weighted as a weighting coefficient with the suitable K plate control amount thus obtained, and the K plate substitution ratio is decided from the thus set K plate control amount and the K plate substitution ratio function, and wherein
  finally the ink amounts of CMYK are calculated as four-dimensional color reproduction data.

12. A color reproduction data conversion method as claimed in claim 3, wherein at least one of the CMYK ink amount mapping function and the achromatic amount limit of an achromatic amount function performs a K plate generation by storing as a profile of K plate generation of an amount previously obtained, and by making successive callings.

13. A color reproduction data conversion method as claimed in claim 3, wherein, when a point of a color gamut outside of a print is required for calculation of the ink amount of CMYK, the K plate outside the color gamut is estimated with maximum likelihood by using a parameter of the same dimension as the restraint condition used for calculation of said achromatic amount in such a way that the K plate outside the color gamut becomes continued from the K plate inside the color gamut, and then, if the thus assumed K plate is no less than 0% and no more than 100%, the CMY ink amounts outside the color gamut are obtained by obtaining the color matching ink amounts in the assumed K plate, and if the assumed K plate is less than 0% or more than 100%, the imaginary amounts of CMY ink outside the color gamut continuing from inside the color gamut are estimated from a recurrence formula in a specified division space.

14. A color reproduction data conversion method as claimed in claim 4, wherein, when a point of a color gamut outside of a print is required for calculation of the ink amount of CMYK, the K plate outside the color gamut is estimated with maximum likelihood by using a parameter of the same dimension as the restraint condition used for calculation of said achromatic amount in such a way that the K plate outside the color gamut becomes continued from the K plate inside the color gamut, and then, if the thus assumed K plate is no less than 0% and no more than 100%, the CMY ink amounts outside the color gamut are obtained by obtaining the color matching ink amounts in the assumed K plate, and if the assumed K plate is less than 0% or more than 100%, the imaginary amounts of CMY ink outside the color gamut continuing from inside the color gamut are estimated from a recurrence formula in a specified division space.

15. A color reproduction data conversion method as claimed in claim 8, wherein said forward normal lattice mapping function is obtained by subjecting specified color patches to colorimetry and by performing the forward conversion obtained by an interpolation calculation from four-dimensional CMYK color space to three-dimensional colorimetric space.

16. A color reproduction data conversion method as claimed in claim 8, wherein said K plate restraint condition is a K plate substitution ratio for each amount of the K plate which is defined as a ratio between a total amount of CMYK in each amount of the K plate and a total amount of CMY in the case of the K plate amount being a reference amount, and wherein said K plate substitution ratio for each K plate amount is obtained by performing inverse conversion from a three-dimensional colorimetric space to a three-dimensional CMY color space as to a plurality of different amounts of the K plate, including the reference amount with the use of the forward normal lattice mapping function to obtain ink amounts of CMY colors being metamer with the three-dimensional colorimetric data, and increase of the amount of the K plate being the reference amount as to the plurality of the different amounts of the K plate, thereby obtaining the ratio between the total amounts of CMYK for each K plate amount thus obtained and in case of the K plate amount being the reference amount.

17. A color reproduction data conversion method as claimed in claim 9, wherein said K plate restraint condition is a K plate substitution ratio for each amount of the K plate which is defined as a ratio between a total amount of CMYK in each amount of the K plate and a total amount of CMY in the case of the K plate amount being a reference amount, and wherein said K plate substitution ratio for each K plate amount is obtained by performing inverse conversion from a three-dimensional colorimetric space to a three-dimensional CMY color space as to a plurality of different amounts of the K plate, including the reference amount with the use of the forward normal lattice mapping function to obtain ink amounts of CMY colors being metamer with the three-dimensional colorimetric data, and increase of the amount of the K plate being the reference amount as to the plurality of the different amounts of the K plate, thereby obtaining the ratio between the total amounts of CMYK for each K plate amount thus obtained and in case of the K plate amount being the reference amount.

18. A color reproduction data conversion method as claimed in claim 16, wherein
  said K plate substitution ratio comprises a K plate substitution ratio function being a variable of the K plate amount in an effective reproduction area, and said K plate control amount is obtained as a weighting coefficient reflected to successive K plate substitution ratios in order to perform a weighting to the K plate substitution ratio, wherein
  said setting of the K plate restraint condition is performed in such a way that a suitable K plate control amount is obtained as a parameter reflected to the K plate restraint condition for image analytical data obtained from the three-dimensional colorimetric data, the K plate substitution ratio is weighted as a weighting coefficient with the suitable K plate control amount thus obtained, and the K plate substitution ratio is decided from the thus set K plate control amount and the K plate substitution ratio function, and wherein finally the ink amounts of CMYK are calculated as four-dimensional color reproduction data.

19. A color reproduction data conversion method as claimed in claim 17, wherein said K plate substitution ratio comprises a K plate substitution ratio function being a variable of the K plate amount in an effective reproduction area, and said K plate control amount is obtained as a weighting coefficient reflected to successive K plate substitution ratios in order to perform a weighting to the K plate substitution ratio, wherein said setting of the K plate restraint condition is performed in such a way that a suitable K plate control amount is obtained as a parameter reflected to the K plate restraint condition for image analytical data obtained from the three-dimensional colorimetric data, the K plate substitution ratio is weighted as a weighting coefficient with the suitable K plate control amount thus obtained, and the K plate substitution ratio is decided from the thus set K plate control amount and the K plate substitution ratio function, and wherein finally the ink amounts of CMYK are calculated as four-dimensional color reproduction data.

20. A color reproduction data conversion method as claimed in claim 12, wherein, when a point of a color gamut outside of a print is required for calculation of the ink amount of CMYK, the K plate outside the color gamut is estimated with maximum likelihood by using a parameter of the same dimension as the restraint condition used for calculation of said achromatic amount in such a way that the K plate outside the color gamut becomes continued from the K plate inside the color gamut, and then, if the thus assumed K plate is no less than 0% and no more than 100%, the CMY ink amounts outside the color gamut are obtained by obtaining the color matching ink amounts in the assumed K plate, and if the assumed K plate is less than 0% or more than 100%, the imaginary amounts of CMY ink outside the color gamut continuing from inside the color gamut are estimated from a recurrence formula in a specified division space.

21. A color reproduction data conversion method as claimed in claim 15, wherein said K plate restraint condition is a K plate substitution ratio for each amount of the K plate which is defined as a ratio between a total amount of CMYK in each amount of the K plate and a total amount of CMY in the case of the K plate amount being a reference amount, and wherein said K plate substitution ratio for each K plate amount is obtained by performing inverse conversion from a three-dimensional calorimetric space to a three-dimensional CMY color space as to a plurality of different amounts of the K plate, including the reference amount with the use of the forward normal lattice mapping function to obtain ink amounts of CMY colors being metamer with the three-dimensional calorimetric data, and increase of the amount of the K plate being the reference amount as to the plurality of the different amounts of the K plate, thereby obtaining the ratio between the total amounts of CMYK for each K plate amount thus obtained and in case of the K plate amount being the reference amount.

22. A color reproduction data conversion method as claimed in claim 21, wherein said K plate substitution ratio comprises a K plate substitution ratio function being a variable of the K plate amount in an effective reproduction area, and said K plate control amount is obtained as a weighting coefficient reflected to successive K plate substitution ratios in order to perform a weighting to the K plate substitution ratio, wherein said setting of the K plate restraint condition is performed in such a way that a suitable K plate control amount is obtained as a parameter reflected to the K plate restraint condition for image analytical data obtained from the three-dimensional colorimetric data, the K plate substitution ratio is weighted as a weighting coefficient with the suitable K plate control amount thus obtained, and the K plate substitution ratio is decided from the thus set K plate control amount and the K plate substitution ratio function, and wherein finally the ink amounts of CMYK are calculated as four-dimensional color reproduction data.

* * * * *

UNITED STATES PATENT AND TRADEMARK OFFICE
CERTIFICATE OF CORRECTION

PATENT NO. : 6,377,366 B2
DATED : August 17, 2004
INVENTOR(S) : William John Gauthier et al.

It is certified that error appears in the above-identified patent and that said Letters Patent is hereby corrected as shown below:

Column 2,
Line 6, replace "wit hCp'" with -- with Cp' --;

Column 6,
Line 47, replace "hydrocyl" with -- hydroxyl --; and

Column 11,
Line 35, replace "MgCO$^2$" with -- MgCO$_2$ --.

Column 24,
Line 46, replace "RM" with -- R" --.

Signed and Sealed this

Fifteenth Day of February, 2005

JON W. DUDAS
*Director of the United States Patent and Trademark Office*